United States Patent
Chopra et al.

(10) Patent No.: US 8,097,661 B2
(45) Date of Patent: Jan. 17, 2012

(54) INK COMPOSITIONS AND METHODS

(75) Inventors: Naveen Chopra, Oaville (CA); Stephan V. Drappel, Mississauga (CA); Michelle N. Chretien, Mississauga (CA); Barkev Keoshkerian, Thornhill (CA); Peter G. Odell, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 6 days.

(21) Appl. No.: 12/765,341

(22) Filed: Apr. 22, 2010

(65) Prior Publication Data

US 2011/0262643 A1    Oct. 27, 2011

(51) Int. Cl.
C08F 2/42 (2006.01)
C08F 2/50 (2006.01)
C08J 3/28 (2006.01)
C09D 11/08 (2006.01)
C09D 11/12 (2006.01)
C09D 11/00 (2006.01)

(52) U.S. Cl. ............ 522/173; 522/71; 522/74; 522/104; 522/107; 522/100; 522/90; 522/96; 522/150; 522/151; 522/156; 522/174; 522/178; 522/182; 522/909; 106/31.13; 106/31.6; 428/32.26; 428/32.27; 427/508; 427/487; 427/514

(58) Field of Classification Search .............. 522/71, 522/74, 104.107, 100, 96, 90, 150, 151, 152, 522/155, 173, 174, 178, 12, 909; 106/31.13, 106/31.6; 523/160; 428/32.26, 32.27; 427/508; 427/487, 514
See application file for complete search history.

(56) References Cited

U.S. PATENT DOCUMENTS

| | | | |
|---|---|---|---|
| 4,889,560 A | 12/1989 | Jaeger et al. | |
| 4,889,761 A | 12/1989 | Titterington et al. | |
| 5,195,430 A | 3/1993 | Rise | |
| 5,221,335 A | 6/1993 | Williams et al. | |
| 5,372,852 A | 12/1994 | Titterington et al. | |
| 5,389,958 A | 2/1995 | Bui et al. | |
| 5,621,022 A | 4/1997 | Jaeger et al. | |
| 5,783,657 A | 7/1998 | Pavlin et al. | |
| 6,111,055 A | 8/2000 | Berger et al. | |
| 6,994,845 B2 | 2/2006 | Mattai et al. | |
| 7,270,408 B2 | 9/2007 | Odell et al. | |
| 7,276,614 B2 | 10/2007 | Toma et al. | |
| 7,279,587 B2 | 10/2007 | Odell et al. | |
| 7,559,639 B2 | 7/2009 | Belelie et al. | |
| 7,563,489 B2 | 7/2009 | Carlini et al. | |
| 7,632,546 B2 | 12/2009 | Odell et al. | |
| 2002/0001698 A1* | 1/2002 | Blankenship et al. | 428/195 |
| 2006/0119686 A1 | 6/2006 | Odell | |
| 2007/0120910 A1* | 5/2007 | Odell et al. | 347/88 |
| 2007/0142492 A1* | 6/2007 | Odell et al. | 522/74 |
| 2008/0000384 A1* | 1/2008 | Belelie et al. | 106/31.13 |
| 2008/0122914 A1* | 5/2008 | Toma et al. | 347/100 |
| 2008/0218540 A1 | 9/2008 | Iftime et al. | |
| 2009/0038506 A1* | 2/2009 | Odell et al. | 106/31.13 |
| 2009/0046134 A1* | 2/2009 | Belelie et al. | 347/102 |
| 2009/0136681 A1* | 5/2009 | Belelie et al. | 427/532 |
| 2010/0055484 A1 | 3/2010 | Chretien et al. | |

OTHER PUBLICATIONS

U.S. Appl. No. 11/683,011, filed Mar. 7, 2007, to Iftime et al.
U.S. Appl. No. 12/204,307, filed Sep. 4, 2008, to Chretien et al.
U.S. Appl. No. 12/414,946, filed May 29, 2009, to Chretien et al.
New U.S. Patent Application filed Apr. 22, 2010 in the name of Chopra et al.
New U.S. Patent Application filed Apr. 22, 2010 in the name of Chopra et al.
New U.S. Patent Application filed Apr. 22, 2010 in the name of Chopra et al.
"Dimer Acids," *Kirk-Othmer Encyclopedia of Chemical Technology*, vol. 8, 4th Ed. (1992), pp. 223 to 237.
Marger et al., "Phase Change Rapid Prototyping With Aqueous Inks," NIP23 and Digital Fabrication 2007 Conference Proceedings, pp. 908-911.

* cited by examiner

*Primary Examiner* — Sanza McClendon
(74) *Attorney, Agent, or Firm* — Oliff & Berridge, PLC

(57) ABSTRACT

A radiation-curable gel ink with reduced syneresis. The inks include a curable monomer, an organic gellant, a gel-forming wax, an optional photoinitiator, and an optional colorant. Also disclosed are methods of making such inks, and methods of forming images with such inks.

18 Claims, No Drawings ions, such as radiation-curable gel inks, and their use in forming images, such as through inkjet printing. More specifically, this disclosure is directed to radiation-curable gel inks formulated to reduce syneresis, methods of making such inks, and methods of forming images with such inks.

BACKGROUND

Inkjet printing systems and radiation-curable gel inks are known in the art. However, while known gel ink compositions are used successfully, a need remains for improved gel ink compositions capable of being used to develop higher quality images.

For porous substrates, such as paper, reducing ink penetration is a challenge. A highly undesirable manifestation of excess ink penetration is "show-through," where the ink is visible from the back side of the page. To reduce penetration of the ink into the paper substrate prior to cure, some conventional ink formulations include a wax.

However, despite reduced show-through, conventional ink formulations suffer from syneresis. "Syneresis" is the separation or exudation of liquid components from the solid components in a gel.

As a result, there exists a need for gel ink components that can reduce or eliminate syneresis.

SUMMARY

Exemplary inks provide superior print quality while meeting requirements of typical printing processes. This disclosure in embodiments addresses these various needs and problems by providing a radiation-curable gel ink comprising a curable monomer, an organic gellant, a gel-forming wax, an optional photoinitiator, and an optional colorant. The gel-forming wax reduces syneresis. Also disclosed are methods for making the inks and methods of forming images with the inks.

These and other improvements are accomplished by the compositions and methods described in embodiments herein.

EMBODIMENTS

This disclosure is not limited to the particular embodiments described herein, and some components and processes may be varied by one of ordinary skill, based on this disclosure.

The radiation-curable inks disclosed herein contain a gel-forming wax that reduces syneresis and improves ink homogeneity. By improving these properties, the inks avoid show-through and result in higher quality images while maintaining the desirable properties of radiation-curable inks. For example, the inks have reduced jetting and gelling temperatures as compared to, for example, standard hot-melt inkjet inks. Standard hot-melt inkjet inks must be jetted at very high temperatures, whereas the presently disclosed inkjet ink compositions may exhibit lower gelling and jetting temperatures. Lower gelling temperatures can further facilitate smoothing or leveling of the jetted ink by the application of heat, which, in turn, results in higher quality images.

In this specification and the claims that follow, singular forms such as "a," "an," and "the" include plural forms unless the content clearly dictates otherwise. All ranges disclosed herein include, unless specifically indicated, all endpoints and intermediate values. In addition, reference may be made to a number of terms that shall be defined as follows:

The term "functional group" refers, for example, to a group of atoms arranged in a way that determines the chemical properties of the group and the molecule to which it is attached. Examples of functional groups include halogen atoms, hydroxyl groups, carboxylic acid groups and the like.

The term "short-chain" refers, for example, to hydrocarbon chains in which n represents the number of carbon atoms in the chain and wherein n is a number of from about 1 to about 7, such as from about 2 to about 5, or from about 3 to about 4.

The term "curable" describes, for example, a material that may be cured via polymerization or is chain extendable, including for example free radical polymerization or chain extension, cationic polymerization or chain extension, and/or in which polymerization is photoinitiated with a radiation-sensitive photoinitiator. The term "radiation-curable" refers, for example, to all forms of curing upon exposure to a radiation source, including light and heat sources and including in the presence or absence of initiators. Exemplary radiation-curing techniques include curing using ultraviolet (UV) light, for example having a wavelength of 200-400 nm, or using visible light, optionally in the presence of photoinitiators and/or sensitizers, curing using electron-beam radiation, optionally in the absence of photoinitiators, curing using thermal curing in the presence or absence of high-temperature thermal initiators (and which may be largely inactive at the jetting temperature), and appropriate combinations thereof.

As used herein, the term "viscosity" refers to a complex viscosity, which is the typical measurement provided by a mechanical rheometer capable of subjecting a sample to a steady shear strain or a small amplitude sinusoidal deformation. In this type of instrument, the shear strain is applied by the operator to the motor and the sample deformation (torque) is measured by the transducer. Alternatively, a controlled-stress instrument, where the shear stress is applied and the resultant strain is measured, may be used. Such a rheometer provides a periodic measurement of viscosity at various plate rotation frequencies, $\omega$, rather than the transient measurement of, for instance, a capillary viscometer. The reciprocating plate rheometer is able to measure both the in phase and out of phase fluid response to stress or displacement. The complex viscosity, $\eta^*$, is defined as $\eta^*=\eta'-i\,\eta''$; where $\eta'=G''/\omega$, $\eta''=G'/\omega$ and $i$ is $\sqrt{-1}$. Alternatively a viscometer that can measure only the transient measurement of, for instance, a capillary or shear viscosity can also be used.

"Optional" or "optionally" refer, for example, to instances in which subsequently described circumstance may or may not occur, and include instances in which the circumstance occurs and instances in which the circumstance does not occur.

The terms "one or more" and "at least one" refer, for example, to instances in which one of the subsequently described circumstances occurs, and to instances in which more than one of the subsequently described circumstances occurs.

Monomers

The ink composition may include one or more monomers. The combination of the co-monomers may aid in solubilizing the gellant material. The monomers may be chosen from any suitable radiation-curable monomers.

The ink compositions may comprise a first monomer, due to the solubility and gelling properties of gellant materials, such as epoxy-polyamide composite gellants, which are useful for producing ink compositions including an ink vehicle having a thermally-driven and reversible gel phase, where the ink vehicle is comprised of curable liquid monomers, such as UV-curable liquid monomers. The gel phase of such ink compositions allows an ink droplet to be pinned to a receiving substrate.

Examples of curable monomers include propoxylated neopentyl glycol diacrylate (such as SR-9003 from Sartomer), diethylene glycol diacrylate, triethylene glycol diacrylate, hexanediol diacrylate, dipropyleneglycol diacrylate, tripropylene glycol diacrylate, alkoxylated neopentyl glycol diacrylate, isodecyl acrylate, tridecyl acrylate, isobornyl acrylate, isobornyl (meth)acrylate, propoxylated trimethylolpropane triacrylate, ethoxylated trimethylolpropane triacrylate, di-trimethylolpropane tetraacrylate, dipentaerythritol pentaacrylate, ethoxylated pentaerythritol tetraacrylate, propoxylated glycerol triacrylate, isobornyl methacrylate, lauryl acrylate, lauryl methacrylate, neopentyl glycol propoxylate methylether monoacrylate, isodecylmethacrylate, caprolactone acrylate, 2-phenoxyethyl acrylate, isooctylacrylate, isooctylmethacrylate, mixtures thereof and the like. As relatively non-polar monomers, mention may be made of isodecyl(meth)acrylate, caprolactone acrylate, 2-phenoxyethyl acrylate, isooctyl(meth)acrylate, and butyl acrylate. In addition, multifunctional acrylate monomers/oligomers may be used not only as reactive diluents, but also as materials that can increase the cross-link density of the cured image, thereby enhancing the toughness of the cured images.

The term "curable monomer" encompasses curable oligomers, which may also be used in the composition. Suitable radiation-curable oligomers have a low viscosity, for example, from about 50 cPs to about 10,000 cPs, or from about 75 cPs to about 7,500 cPs, or from about 100 cPs to about 5,000 cPs. Examples of such oligomers include CN549, CN131, CN131B, CN2285, CN 3100, CN3105, CN132, CN133, CN 132 (all available from Sartomer Company, Inc., Exeter, Pa.), EBECRYL 140, EBECRYL 1140, EBECRYL 40, EBECRYL 3200, EBECRYL 3201, EBECRYL 3212 (all available from Cytec Industries Inc, Smyrna Ga.), PHOTOMER 3660, PHOTOMER 5006F, PHOTOMER 5429, PHOTOMER 5429F (all available from Cognis Corporation, Cincinnati, Ohio), LAROMER PO 33F, LAROMER PO 43F, LAROMER PO 94F, LAROMER UO35D, LAROMER PA 9039V, LAROMER PO 9026V, LAROMER 8996, LAROMER 8765, LAROMER 8986 (all available from BASF Corporation, Florham Park, N.J.), and the like. As multifunctional acrylates and methacrylates, mention may also be made of pentaerythritol tetra(meth)acrylate, 1,2 ethylene glycol di(meth)acrylate, 1,6 hexanediol di(meth)acrylate, 1,12-dodecanol di(meth)acrylate, tris (2-hydroxy ethyl) isocyanurate triacrylate, propoxylated neopentyl glycol diacrylate, hexanediol diacrylate, tripropylene glycol diacrylate, dipropylene glycol diacrylate, amine-modified polyether acrylates (available as PO 83 F, LR 8869, and/or LR 8889 (all available from BASF Corporation)), trimethylolpropane triacrylate, glycerol propoxylate triacrylate, dipentaerythritol penta-/hexa-acrylate, ethoxylated pentaerythritol tetraacrylate (available from Sartomer Co. Inc. as SR 494), and the like.

The co-monomers may be chosen from short-chain alkyl glycol diacrylates or ether diacrylates, such as propoxylated neopentyl glycol diacrylate, or from acrylates having short-chain alkyl ester substituents, such as caprolactone acrylate, and the commercially available products CD536, CD 2777, CD585 and CD586 (all available from Sartomer Co. Inc.).

The radiation-curable gel ink compositions may include one or more co-monomers in an amount ranging from about 10 to about 80 wt % of the ink, such as from about 20 to about 70 wt %, or from about 30 to about 60 wt %.

Gellants

The gel ink composition may include at least one optional organic gellant. The organic gellants function to dramatically increase the viscosity of the ink vehicle and ink composition within a desired temperature range. In particular, the gellant forms a semi-solid gel in the ink vehicle at temperatures below the specific temperature at which the ink composition is jetted. The semi-solid gel phase is a physical gel that exists as a dynamic equilibrium comprised of one or more solid gellant molecules and a liquid solvent. The semi-solid gel phase is a dynamic networked assembly of molecular components held together by non-covalent bonding interactions such as hydrogen bonding, Van der Waals interactions, aromatic non-bonding interactions, ionic or coordination bonding, London dispersion forces, and the like; which upon stimulation by physical forces such as temperature or mechanical agitation or chemical forces such as pH or ionic strength, can reversibly transition from liquid to semi-solid state at the macroscopic level. The ink compositions exhibit a thermally reversible transition between the semi-solid gel state and the liquid state when the temperature is varied above or below the gel-phase transition. This reversible cycle of transitioning between semi-solid gel phase and liquid phase can be repeated many times in the ink composition. Mixtures of one or more gellants may be used to effect the phase-change transition.

The phase change nature of the gellant may be used to cause a rapid viscosity increase in the jetted ink composition following jetting of the ink to the substrate. In particular, jetted ink droplets may be pinned into position on a receiving substrate with a cooler temperature than the ink-jetting temperature of the ink composition through the action of a phase-change transition.

The temperature at which the ink composition forms the gel state is any temperature below the jetting temperature of the ink composition, for example any temperature that is about 10° C. or more below the jetting temperature of the ink composition. There is a rapid and large increase in ink viscosity upon cooling from the jetting temperature at which the ink composition is in a liquid state, to the gel transition temperature, at which the ink composition converts to the gel state. The ink composition of some embodiments may show at least a $10^{2.5}$-fold increase in viscosity.

Suitable gellants may gel the monomers/oligomers in the ink vehicle quickly and reversibly, and demonstrate a narrow phase-change transition, for example within a temperature range of about 20° C. to about 85° C. The gel state of exemplary ink compositions should exhibit a minimum of $10^{2.5}$ mPa·s, such as $10^3$ mPa·s, increase in viscosity at substrate temperatures, for instance, from about 30° C. to about 70° C., compared to the viscosity at the jetting temperature. In some embodiments, the gellant-containing ink compositions rapidly increase in viscosity within 5° C. to 10° C. below the jetting temperature and ultimately reach a viscosity above $10^4$ times the jetting viscosity, for example about $10^5$ times the jetting viscosity.

Suitable gellants include a curable gellant comprised of a curable amide, a curable polyamide-epoxy acrylate component and a polyamide component; a curable composite gellant comprised of a curable epoxy resin and a polyamide resin; mixtures thereof and the like, as disclosed in U.S. application Ser. No. 12/474,946, the disclosure of which is hereby incorporated herein by reference in its entirety. Inclusion of the gellant in the composition permits the composition to be applied over a substrate, such as on one or more portions of the substrate and/or on one or more portions of an image previously formed on the substrate, without excessive penetration into the substrate because the viscosity of the composition is quickly increased as the composition cools following application. Excessive penetration of a liquid into a porous substrate, such as paper, can lead to an undesirable decrease in the substrate opacity. The curable gellant may also participate in the curing of monomer(s) of the composition.

The gellants may be amphiphilic in nature to improve wetting when the composition is used over a substrate having silicone or other oil thereon. "Amphiphilic" refers to molecules that have both polar and non-polar parts of the molecule. For example, the gellants may have long non-polar hydrocarbon chains and polar amide linkages.

Amide gellants include those described in U.S. Patent Application Publication No. 2008/0122914 and U.S. Pat. Nos. 7,276,614 and 7,279,587, the entire disclosures of which are incorporated herein by reference.

The amide gellant may be a compound of the following formula (I):

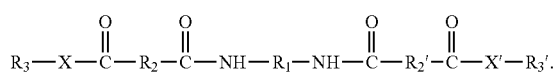

In formula (I), $R_1$ may be:

(i) an alkylene group (wherein an alkylene group is a divalent aliphatic group or alkyl group, including linear and branched, saturated and unsaturated, cyclic and acyclic, and substituted and unsubstituted alkylene groups; and wherein heteroatoms, such as oxygen, nitrogen, sulfur, silicon, phosphorus, boron, and the like either may or may not be present in the alkylene group) having from about 1 to about 12 carbon atoms, such as from about 1 to about 8, or from about 1 to about 5 carbon atoms;

(ii) an arylene group (wherein an arylene group is a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group) having from about 1 to about 15 carbon atoms, such as from about 3 to about 10, or from about 5 to about 8 carbon atoms;

(iii) an arylalkylene group (wherein an arylalkylene group is a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group) having from about 6 to about 32 carbon atoms, such as from about 6 to about 22, or from about 6 to about 12 carbon atoms; or (iv) an alkylarylene group (wherein an alkylarylene group is a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group) having from about 5 to about 32 carbon atoms, such as from about 6 to about 22, or from about 7 to about 15 carbon atoms.

Unless otherwise specified, the substituents on the substituted alkyl, aryl, alkylene, arylene, arylalkylene, and alkylarylene groups disclosed above and hereinafter may be selected from halogen atoms, cyano groups, pyridine groups, pyridinium groups, ether groups, aldehyde groups, ketone groups, ester groups, amide groups, carbonyl groups, thiocarbonyl groups, sulfide groups, nitro groups, nitroso groups, acyl groups, azo groups, urethane groups, urea groups, mixtures thereof, and the like. Optionally, two or more substituents may be joined together to form a ring.

In formula (I), $R_2$ and $R_2'$ each, independently of the other, may be:

(i) alkylene groups having from about 1 to about 54 carbon atoms, such as from about 1 to about 48, or from about 1 to about 36 carbon atoms;

(ii) arylene groups having from about 5 to about 15 carbon atoms, such as from about 5 to about 13, or from about 5 to about 10 carbon atoms;

(iii) arylalkylene groups having from about 6 to about 32 carbon atoms, such as from about 7 to about 33, or from about 8 to about 15 carbon atoms; or (iv) alkylarylene groups having from about 6 to about 32 carbon atoms, such as from about 6 to about 22, or from about 7 to about 15 carbon atoms.

In formula (I), $R_3$ and $R_3'$ each, independently of the other, may be either:

(a) photoinitiating groups, such as groups derived from 1-(4-(2-hydroxyethoxy)phenyl)-2-hydroxy-2-methylpropan-1-one, of the formula (II):

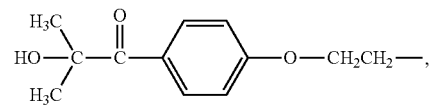

groups derived from 1-hydroxycyclohexylphenylketone, of the formula (III):

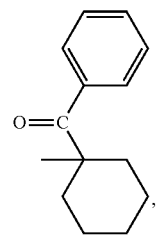

groups derived from 2-hydroxy-2-methyl-1-phenylpropan-1-one, of the formula (IV):

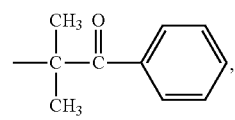

groups derived from N,N-dimethylethanolamine or N,N-dimethylethylenediamine, of the formula (V):

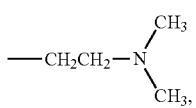

or the like; or (b) a group which is:

(i) an alkyl group (wherein an alkyl group includes linear and branched, cyclic and acyclic, and substituted and unsubstituted alkyl groups, and wherein hetero atoms such as oxygen, nitrogen, sulfur, silicon, phosphorus, boron, and the like, may optionally be present in the alkyl group) having from about 2 to about 100 carbon atoms, such as from about 3 to about 60, or from about 4 to about 30 carbon atoms;

(ii) an aryl group (wherein an aryl group includes substituted and unsubstituted aryl groups) having from about 5 to about 100 carbon atoms, such as from about 5 to about 60, or from about 6 to about 30 carbon atoms, such as phenyl or the like;

(iii) an arylalkyl group having from about 5 to about 100 carbon atoms, such as from about 5 to about 60, or from about 6 to about 30 carbon atoms, such as benzyl or the like; or (iv) an alkylaryl group having from about 5 to about 100 carbon atoms, such as from about 5 to about 60, or from about 6 to about 30 carbon atoms, such as tolyl or the like.

In addition, in formula (I), X and X' each, independently of the other, may be an oxygen atom or a group of the formula —$NR_4$—, wherein $R_4$ is:

(i) a hydrogen atom;

(ii) an alkyl group having from about 5 to about 100 carbon atoms, such as from about 5 to about 60 or from about 6 to about 30 carbon atoms;

(iii) an aryl group having from about 5 to about 100 carbon atoms, such as from about 5 to about 60 or from about 6 to about 30 carbon atoms;

(iv) an arylalkyl group having from about 5 to about 100 carbon atoms, such as from about 5 to about 60 or from about 6 to about 30 carbon atoms; or (v) an alkylaryl group having from about 5 to about 100 carbon atoms, such as from about 5 to about 60 or from about 6 to about 30 carbon atoms;

Further details may be found, for example, in U.S. Pat. Nos. 7,279,587 and 7,276,614.

The gellant may comprise one of or a mixture of formulas (VI), (VII), or (VIII):

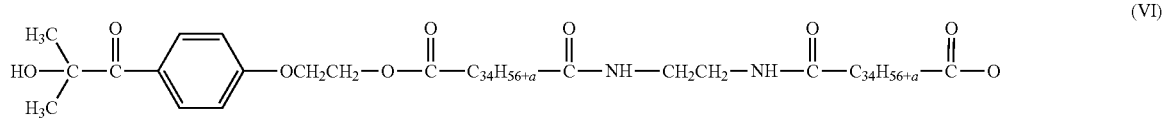

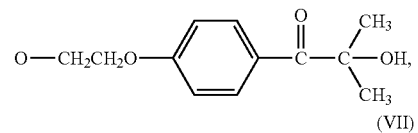

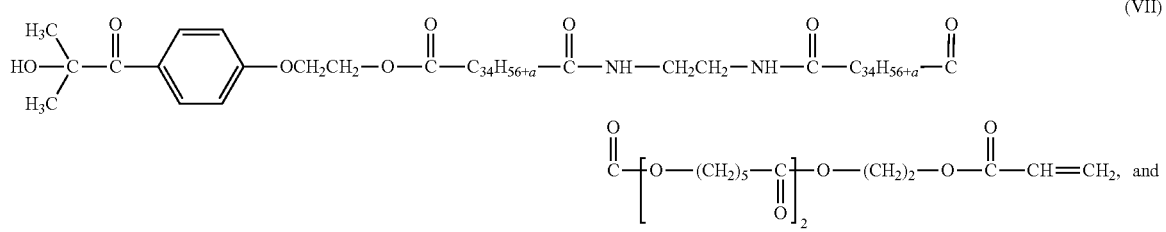

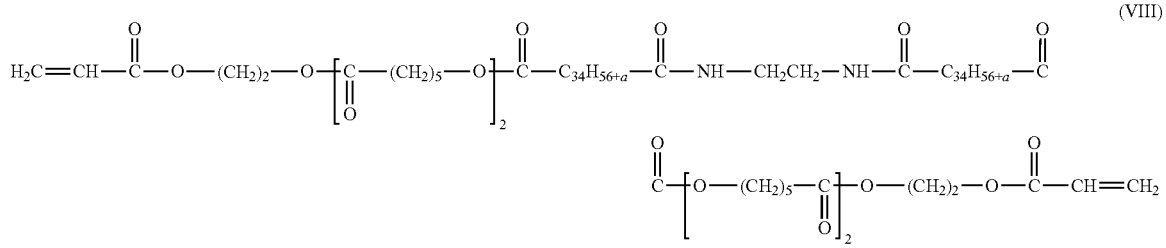

where —$C_{34}H_{56+a}$— represents a branched alkylene group that may include unsaturations and cyclic groups, and the variable "a" is an integer from 0-12.

The gellant may be a composite gellant, for example, a gellant comprised of a curable epoxy resin and a polyamide resin. Suitable composite gellants are described in commonly assigned U.S. Pat. No. 7,563,489, the entire disclosure of which is incorporated herein by reference.

The epoxy resin component in the composite gellant may be any suitable epoxy group-containing material. The epoxy group containing component includes the diglycidyl ethers of either polyphenol-based epoxy resin or a polyol-based epoxy resin, or mixtures thereof. That is, the epoxy resin has two epoxy functional groups that are located at the terminal ends of the molecule. The polyphenol-based epoxy resin is a bisphenol A-co-epichlorohydrin resin with not more than two glycidyl ether terminal groups. The polyol-based epoxy resin may be a dipropylene glycol-co-epichlorohydrin resin with not more than two glycidyl ether terminal groups. Suitable epoxy resins have a weight average molecular weight in the range of from about 200 to about 800, such as from about 300 to about 700. Commercially available sources of the epoxy resins are, for example, the bisphenol-A based epoxy resins from Dow Chemical Corp., such as DER 383, or the dipropyleneglycol-based resins from Dow Chemical Corp., such as DER 736. Other sources of epoxy-based materials originating from natural sources may be used, such as epoxidized triglyceride fatty esters of vegetable or animal origins, for example epoxidized linseed oil, rapeseed oil, and the like, or mixtures thereof. Epoxy compounds derived from vegetable oils such as the VIKOFLEX line of products from Arkema Inc., Philadelphia Pa. may also be used. The epoxy resin component is thus functionalized with acrylate or (meth)acrylate, vinyl ether, allyl ether, and the like, by chemical reaction with unsaturated carboxylic acids or other unsaturated reagents. For example, the terminal epoxide groups of the resin become ring-opened in this chemical reaction, and are converted to (meth)acrylate esters by esterification reaction with (meth)acrylic acid.

As the polyamide component of the epoxy-polyamide composite gellant, any suitable polyamide material may be used. The polyamide is comprised of a polyamide resin derived from a polymerized fatty acid such as those obtained from natural sources (for example, palm oil, rapeseed oil, castor oil, and the like, including mixtures thereof) or the commonly known hydrocarbon "dimer acid," prepared from dimerized C-18 unsaturated acid feedstocks such as oleic acid, linoleic acid, and the like, and a polyamine, such as a diamine (for example, alkylenediamines such as DYTEK series diamines, ethylenediamine, poly(alkyleneoxy)diamines, and the like, or also copolymers of polyamides such as polyester-polyamides and polyether-polyamides. One or more polyamide resins may be used in the formation of the gellant. Commercially available sources of the polyamide resin include, for example, the VERSAMID series of polyamides (available from Cognis Corporation (formerly Henkel Corp.)); in particular VERSAMID 335, VERSAMID 338, VERSAMID 795, and VERSAMID 963, all of which have low molecular weights and low amine numbers; and the SYLVAGEL polyamide resins (available from Arizona Chemical Company), and variants thereof including polyether-polyamide resins may be employed. The composition of the SYLVAGEL resins obtained from Arizona Chemical Company are described as polyalkyleneoxydiamine polyamides with the general formula (IX),

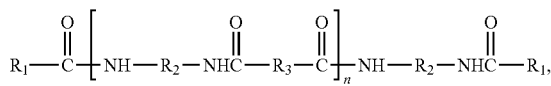
(IX)

wherein $R_1$ is an alkyl group having at least seventeen carbon atoms, $R_2$ includes a polyalkyleneoxide, $R_3$ includes a C-6 carbocyclic group, and n is an integer of at least 1.

The gellant may also comprise a curable polyamide-epoxy acrylate component and a polyamide component, such as those disclosed in commonly assigned U.S. Pat. No. 7,632,546, the entire disclosure of which is incorporated herein by reference. The curable polyamide-epoxy acrylate is curable by virtue of including at least one functional group therein. As an example, the polyamide-epoxy acrylate is difunctional. The functional group(s), such as the acrylate group(s), are radiation-curable via free-radical initiation and enable chemical bonding of the gellant to the cured ink vehicle. A commercially available polyamide-epoxy acrylate is PROTOMER RM370 from Cognis. The curable polyamide-epoxy acrylate may also be selected from within the structures described above for the curable composite gellant comprised of a curable epoxy resin and a polyamide resin.

The ink composition may include the gellant in any suitable amount, such as from about 1 to about 50 wt % of the ink, or from about 2 to about 20 wt %, or from about 3 to about 10 wt %.

The gellant may comprise a compound of the formula (X):

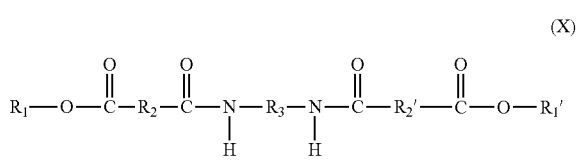
(X)

where:

$R_1$ and $R_1'$ are the same and are selected from the following non-reactive aromatic groups:

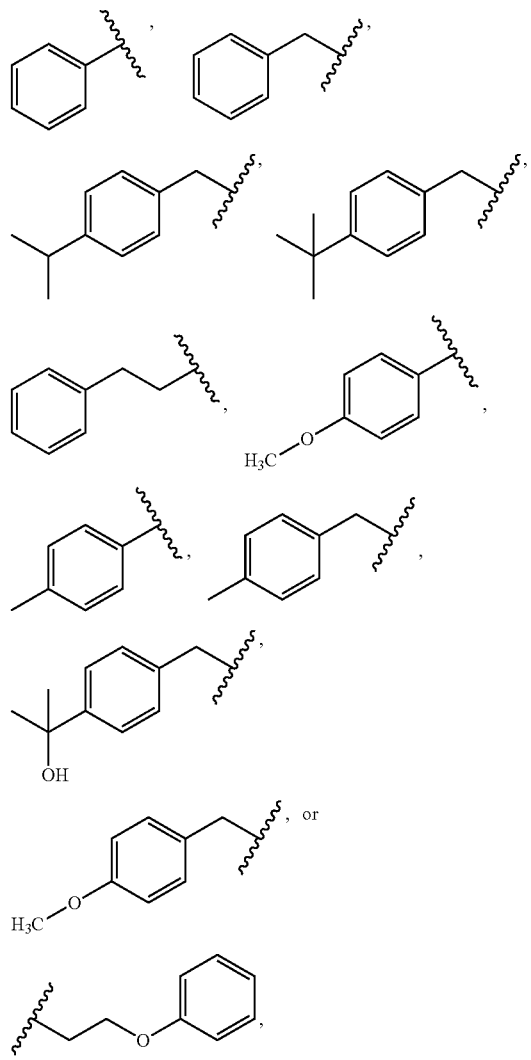

wherein ⁓represents the point of attachment of the $R_1$ and $R_1'$ group.

In some embodiments, $R_1$ and $R_1'$ are the same and are selected from the formulas:

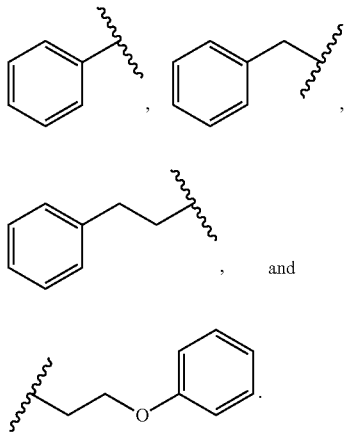
, and

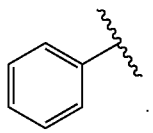
.

In one specific embodiment, $R_1$ and $R_1'$ are each of the formula

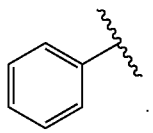

In another specific embodiment, $R_1$ and $R_1'$ are each of the formula

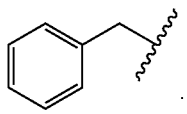

In yet another specific embodiment, $R_1$ and $R_1'$ are each of the formula

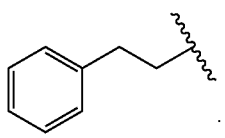

In still another specific embodiment, $R_1$ and $R_1'$ are each of the formula

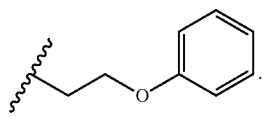

$R_2$ and $R_2'$ are the same or different, and are each independently selected from:

(i) alkylene groups having from about 2 to about 100 carbon atoms, such as at least about 2, 4, 6, 8, 10, 12, 14, 16, 18, 20, 22, 24, 26, 28, 30, 32, 34, or 36 carbon atoms, or no more than about 100, or no more than about 60, or no more than about 50 carbon atoms, or such as having about 36 carbon atoms, although the numbers can be outside of these ranges;

(ii) arylene groups having from about 5 to about 100 carbon atoms, such as, for example, at least about 5 or 6 carbon atoms, or no more than about 100, or no more than about 60, or no more than about 50 carbon atoms, although the numbers can be outside of these ranges;

(iii) arylalkylene groups having from about 6 to about 100 carbon atoms, such as, for example, at least about 6 or 7 carbon atoms, or nor more than about 100, or no more than about 60, or no more than about 50 carbon atoms, although the numbers can be outside of these ranges; and (iv) alkylarylene groups having from about 6 to about 100 carbon atoms, such as, for example, at least 6 or 7 carbon atoms, or no more than about 100, or no more than about 60, or no more than about 50 carbon atoms, although the numbers can be outside of these ranges.

In some embodiments, $R_2$ and $R_2'$ are both alkylene groups, which can be linear or branched, saturated or unsaturated, cyclic or acyclic, and substituted alkylene groups, and hetero atoms may optionally be present in the alkylene group. In some other embodiments, $R_2$ and $R_2'$ are both saturated alkylene groups. In other embodiments, $R_2$ and $R_2'$ are both unsubstituted alkylene groups. In some embodiments, $R_2$ and $R_2'$ are each of the formula $$-C_{34}H_{56+a}-$$

and are branched alkylene groups that may include unsaturations and cyclic groups, where a is an integer of 0, 1, 2, 3, 4, 5, 6, 7, 8, 9, 10, 11, or 12. In some other embodiments, $R_2$ and $R_2'$ include isomers of the formula

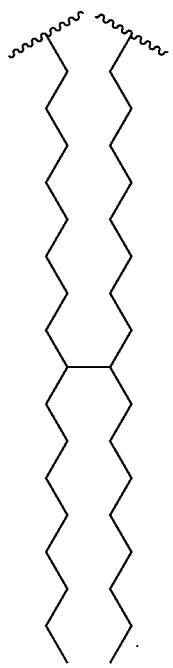

$R_3$ is:

(i) an alkylene group having from about 2 to about 80 carbon atoms, such as, for example, at least about 2 carbon atoms, or no more than about 80, 60, 50, or 36 carbon atoms, although the numbers of carbon atoms can be outside of these ranges;

(ii) an arylene group having from about 2 to about 50 carbon atoms, such as, for example, about 2 carbon atoms, or having no more than about 5 or 6 carbon atoms, or no more than about 50, 25, or 18 carbon atoms, although the numbers of carbon atoms can be outside of these ranges;

(iii) an arylalkylene group having from about 6 to about 50 carbon atoms such as, for example, at least about 6 or 7 carbon atoms, or no more than about 50, 36, or 18 carbon atoms, although the numbers of carbon atoms can be outside of these ranges; or (iv) an alkylarylene group having from about 6 to about 50 carbon atoms, such as, for example, at least about 6 or 7 carbon atoms, or no more than about 50, 36, or 18 carbon atoms, although the numbers of carbon atoms can be outside of these ranges.

In some embodiments, $R_3$ is a linear or branched alkylene group, which can be saturated or unsaturated, substituted or unsubstituted alkylene groups, and where hetero atoms may optionally be present in the alkylene group. In a specific embodiment, $R_3$ is an ethylene group

—CH$_2$CH$_2$—.

In embodiments where $R_1$ and $R_1'$ are a single species end-capping both ends of the gellant compound, a single gellant product is provided, rather than a mixture, thereby eliminating the need for complex post-reaction purification and processing. The gellant composition functionalized with identical aromatic end-cap molecules provides enhanced spectral transmission and gelation properties, such as reduced ultraviolet absorbance, higher thermal stability, and higher ultimate viscosity over prior gellant compounds.

Aromatic end-capped gellant compounds have reduced ultraviolet absorbance that enables more efficient ultraviolet cure of a phase change ink prepared with the present gellants. In certain embodiments, the compounds herein provide an absorbance of from about 0 to about 0.8, or from about 0 to about 0.7, or from about 0 to about 0.6 at a wavelength of from about 230 to about 400 nanometers.

In embodiments where $R_1$ and $R_1'$ are the same non-reactive end-cap molecule, the resultant gellant compound exhibits high thermal stability. With respect to thermal stability, heating of a conventional gellant overnight in an oven at 85° C. yields a product that is incompletely soluble in monomer. In embodiments herein, gellants with aromatic end-cap functionality are stable for at least about 8 weeks in an oven at 85° C. and the material is freely soluble in monomer. As used here, "stable" means that there is no crosslinking or decomposition of the gellant material, and it remains completely soluble in monomer. The use of a single end-cap species results in cleaner product synthesis with fewer side products.

In certain embodiments, the compounds herein provide a complex viscosity of from about $10^4$ centipoise (cps) to about $10^8$ cps, or from about $10^5$ cps to about $10^7$ cps, or from about $10^5$ cps to about $10^6$ cps at a temperature of from about 10 to about 50° C.

Specific gellant compounds may be of one of the following formulas:

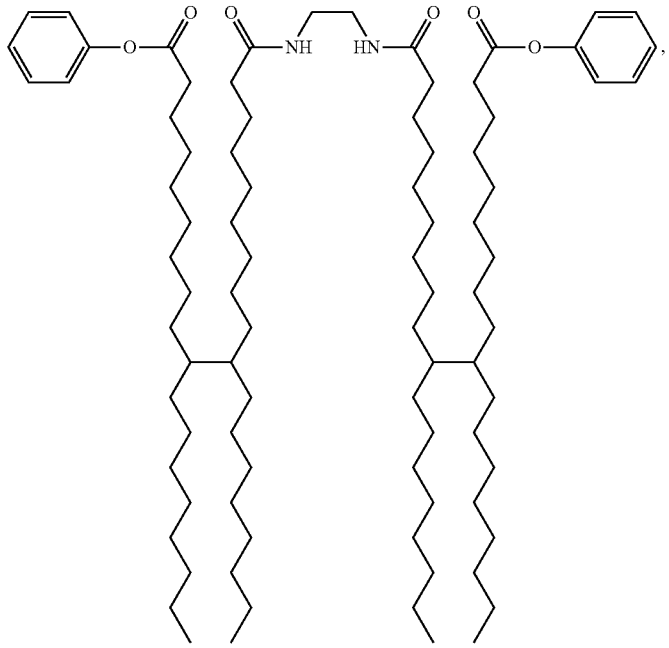

-continued
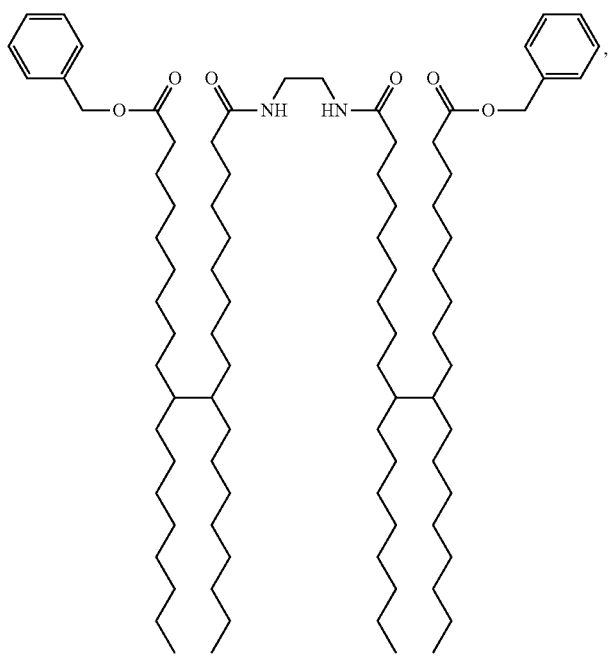
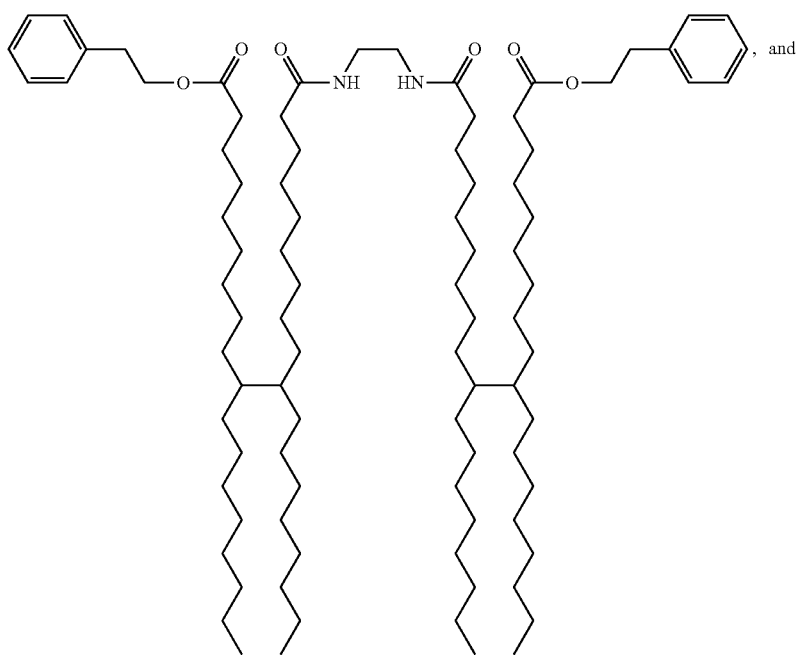

-continued

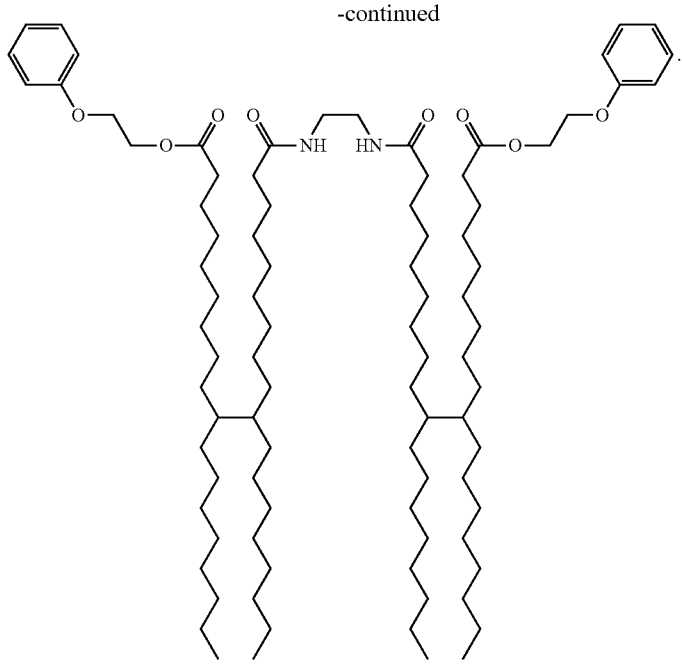

The gellant may comprise a compound of the formula (XI):

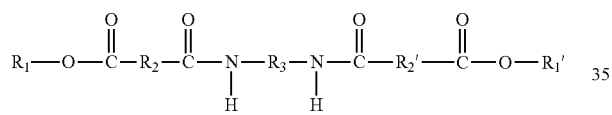

(XI)

where $R_2$, $R_2'$ and $R_3$ are as described above for formula (X), and $R_1$ and $R_1'$ can be the same or different, and each, independently of the other, is:

(i) an alkyl group having a least one ethylenic unsaturation therein and having at least about 2, 3, or 4 carbon atoms, or no more than about 100, 60, or 30 carbon atoms, although the number of carbon atoms can be outside of these ranges;

(ii) an arylalkyl group having at least one ethylenic unsaturation therein, and having from about 6 to about 100 carbon atoms, such as, for example, at least about 6 or 7 carbon atoms, or no more than about 100, 60, or 30 carbon atoms, although the number of carbon atoms can be outside of these ranges;

(iii) an alkylaryl group having at least one ethylenic unsaturation therein, having about 6 to about 100 carbon atoms, such as at least about 6 or 7 carbon atoms, or not more than about 100, 60, or 30 carbon atoms, although the number of carbon atoms can be outside of these ranges, such as tolyl or the like; or (iv) a non-reactive aromatic group; provided that at least one of $R_1$ and $R_1'$ is a non-reactive aromatic group, and provided that neither of $R_1$ or $R_1'$ is a photoinitiator group.

One of $R_1$ or $R_1'$ may be selected from the following formulas:

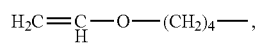

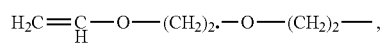

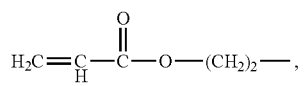

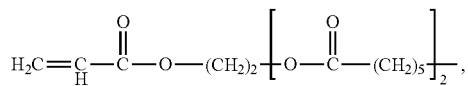

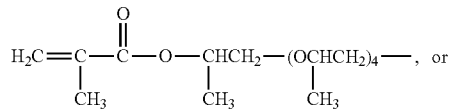

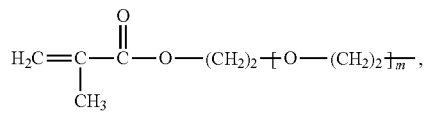

where "m" is an integer representing the number of repeating $(O-(CH_2)_2$ units. The variable "m" may be an integer from 1 to 10, or "m" may be an integer greater than 10.

Specific examples of suitable gellant compounds include the following formulas:

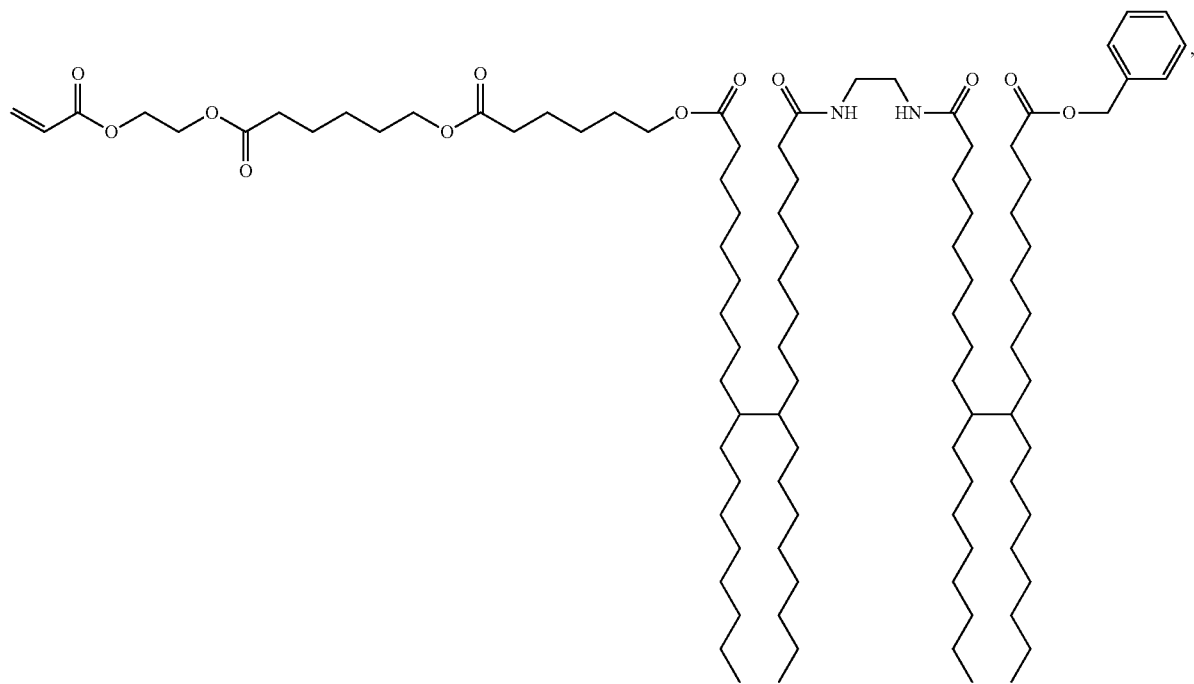

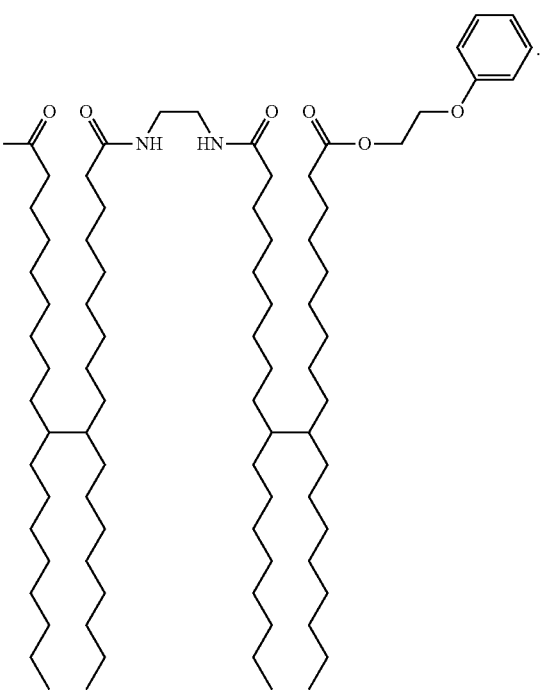

Compounds as disclosed herein can be prepared by any desired or effective method. For example, in one specific embodiment, about 2 molar equivalents of a diacid of the formula HOOC—$R_2$—COOH, and about one molar equivalent of a diamine of the formula

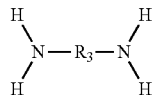

can be reacted by use of a coupling agent such as 1,3-dicyclohexylcarbodimide (DCC) in the present of a catalyst such as 4-dimethylaminopyridine (DMAP) in the presence of a solvent such as methylene chloride ($CH_2Cl_2$) at reduced temperatures followed by eventual warming to about room temperature to produce an organoamide intermediate.

The diacid and the diamine can be present in any desired or effective relative amounts, such as, for example, at least about 1.75 moles of diacid per every 1 mole of diamine, or at least about 2 moles of diacid per every 1 mole of diamine, or no more than about 2.5 moles of diacid per every 1 mole of diamine, or no more than about 2.3 moles of diacid per every 1 mole of diamine, or no more than about 2.1 moles of diacid per every 1 mole of diamine, although the relative amounts can be outside of these ranges.

In one embodiment, to the resulting reaction mixture containing the organoamide intermediate may be added about two molar equivalents of an identical aromatic end-cap molecule having the formula $R_1$—OH. In another embodiment, to the resulting reaction mixture containing the organoamide intermediate can be added about one molar equivalent of a first end-cap molecule which is an aromatic alcohol having the formula $R_1$—OH as described herein and about one molar equivalent of a second end-cap molecule which is an alkyl group having at least one ethylenic unsaturation, an arylalkyl group having at least one ethylenic unsaturation, or an alkylaryl group having at least one ethylenic unsaturation, as described herein. In a specific embodiment, the second end-cap molecule is caprolactone acrylate.

The organoamide intermediate and the aromatic alcohol may be present in any desired or effective relative amounts. For example, where $R_1$ and $R_{1'}$ are the same and comprise an aromatic alcohol, in one embodiment, at least about 1.75 moles of aromatic alcohol per every 1 mole of organoamide intermediate, or at least about 2 moles of aromatic alcohol per every 1 mole of organoamide intermediate, or at least about 2.25 moles of aromatic alcohol per every 1 mole of organoamide intermediate, or no more than about 3 moles of aromatic alcohol per every 1 mole of organoamide intermediate, or no more than about 2.75 moles of aromatic alcohol per every 1 mole of organoamide intermediate, or no more than about 2.5 moles of aromatic alcohol per every 1 mole of organoamide intermediate, although the relative amounts can be outside of these ranges. Where $R_1$ and $R_{1'}$ are two different species, the combined total amount of $R_1$ and $R_{1'}$ is, in embodiments, at least about 1.75, 2, 2.25 moles per every 1 mole of organoamide intermediate, or no more than about 2.75 or no more than about 2.5 moles (combined total of $R_1$ and $R_{1'}$), although the relative amounts can be outside of these ranges.

The ingredients may be mixed together in the sequence just described and a one pot reaction may be employed. For example, molten organoamide intermediate can be added to a 1 liter round bottomed flask equipped with a magnetic stir bar, followed by dichloromethane solvent with stirring until the organoamide intermediate is completely dissolved to form a clear, golden solution. A catalyst, such as DMAP, can be added, followed by a coupling agent, such as DCC.

Next, in one embodiment, a single species of end-cap molecule can be added to the reaction mixture containing the organoamide intermediate. Alternately, in another embodiment, a first species of end-cap molecule being an aromatic alcohol and a second species of end-cap molecule that is different from the aromatic alcohol can be added simultaneously to the reaction mixture.

The reaction mixture containing the organoamide intermediate or and the single end-cap component or the mixed end-cap components can be allowed to stir overnight at room temperature. The reaction contents can then be filtered to remove N,N-dicyclohexylurea (DCHU) by-product. The filtrate can be concentrated on a rotary evaporator resulting in a golden gel-like solid amide gellant. The solid residue can be dried in a vacuum oven, such as for about 2 hours at about 90° C., to remove residual solvent from the amide gellant.

Suitable coupling agents include: 1,3-dicyclohexylcarbodiimide (DCC) of the formula

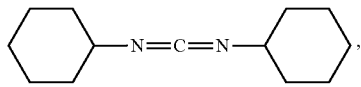

1-(3-(dimethylamino)propyl)3-ethylcarbodiimide HCl (EDCl), N,N-carbonyldiimidazole, N-cyclohexyl-N'-(2-morpholinoethyl)-carbodiimide methyl-p-toluenesulfonate, (benzotriazol-1-yloxy)tris(dimethylamino)phosphonium hexafluorophosphate (BOP), (o-benzotriazol-1-yl)-N,N,N', N'-bis(tetramethylene(uranium hexafluorophosphate (HBTU), bis(2-oxo-3-oxazolidinyl)phosphonic chloride (BOP-Cl), (1H-1,2,3-benzotriazol-1-yloxy)tris(pyrrolidino) phosphonium hexafluoro phosphate (PyBOP), and the like, and mixtures and combinations thereof.

The coupling agent and the diacid can be present in any desired or effective relative amounts. The coupling agent and the diacid may be present in an amount of at least about 1.8 moles of coupling agent per every 1 mole of diacid, or at least about 1.9 moles of coupling agent per every 1 mole of diacid, or at least about 2 moles of coupling agent per every 1 mole of diacid, or no more than about 2.75 moles of coupling agent per every 1 mole of diacid, or no more than about 2.5 moles of coupling agent per every 1 mole of diacid, or no more than about 2.2 moles of coupling agent per every 1 mole of diacid, although the relative amounts can be outside of these ranges. Examples of suitable catalysts include 4-dimethylaminopyridine (DMAP), of the formula

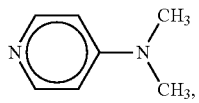

triethylamine, 1,8-diazabicyclo(4a.4.)undec-7-ene (DBU), and the like, and mixtures and combinations thereof.

The catalyst and the diacid are present in any desired or effective relative amounts. The catalyst and the diacid may be present in an amount of at least about 0.05 mole of catalyst per every 1 mole of diacid, or at least about 0.1 mole of catalyst per every 1 mole of diacid, or at least about 0.2 mole of catalyst per every 1 mole of diacid, or no more than about 1 mole of catalyst per every 1 mole of diacid, or no more than about 0.8 mole of catalyst per every 1 mole of diacid, or no more than about 0.5 mole of catalyst per every 1 mole of diacid, although the relative amounts can be outside of these ranges.

Any desired or effective solvent can be employed. Examples of suitable solvents include methylene chloride, tetrahydrofuran, methyl ethyl ketone, toluene, dimethyl formamide, diethyl ether, hexane, ethyl acetate, and the like, and mixtures and combinations thereof.

The solvent can be present in any desired or effective amount, such as in an amount of at least about 10 milliliters of solvent per milimole of diacid, or at least about 15 milliliters of solvent per milimole of diacid, or at least about 20 milliliters of solvent per milimole of diacid, or no more than about 50 milliliters of solvent per milimole of diacid, or no more than about 40 milliliters of solvent per milimole of diacid, or no more than about 30 milliliters of solvent per milimole of diacid, although the amount of solvent can be outside of these ranges.

The reaction between the diacid, the diamine, and the coupling agent can be carried out at any desired or effective temperature, such as from at least about 0° C. to no more than about 50° C., or from about 5° C. to about 40° C., or from about 15° C. to about 30° C., although the temperature can be outside of these ranges.

The subsequent reaction between the resulting amine-terminated diamide intermediate and the additional diacid can be carried out at any desired or effective temperature, such as from at least about 0° C. to no more than about 50° C., or from about 5° C. to about 40° C., or from about 15° C. to about 30° C., although the temperature can be outside of these ranges.

The subsequent reaction between the resulting organoamide intermediate and the aromatic alcohol can be carried out at any desired or effective temperature, such as from at least about 15° C. to no more than about 40° C., or from about 20° C. to about 35° C., or from about 25° C. to about 30° C., although the temperature can be outside of these ranges.

The reaction between the diacid and the diamine can be carried out for any desired or effective period of time, such as for about 2 to about 5 hours, although the period of time can be outside of this range.

The reaction between the organoamide intermediate and the aromatic alcohol, or mixture of aromatic alcohol and second end-cap molecule, can be carried out for any desired or effective period of time, such as from about 1.5 hours to about 12 hours, or from about 2 to about 5 hours, or from about 2.5 to about 4 hours, although the period of time can be outside of these ranges.

Subsequent to completion of the reaction, the product can be treated by any desired or effective method, such as filtration of any solid by-products or washing the solution with water depending on the coupling agent used. The solvent can be removed by rotary evaporation. If needed, the product can be purified by washing with acetone and dried in a vacuum oven.

Compounds as disclosed herein may also be prepared by first reacting about n+1 molar equivalents of a diacid of the formula HOOC—$R_2$—COOH and about n molar equivalent of a diamine of the formula

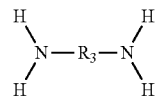

under neat conditions (i.e., in the absence of a solvent) at elevated temperatures while removing water from the reaction mixture to form an acid-terminated oligoamide of the formula

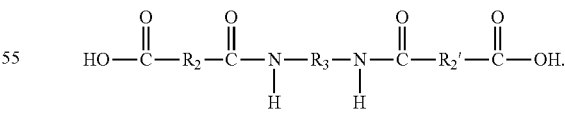

Thereafter, the acid-terminated oligoamide thus formed is reacted with about 2 molar equivalents of an aromatic alcohol of the formula $R_1$—OH or the acid-terminated organoamide thus formed is reacted with about 1 molar equivalent of an aromatic alcohol of the formula $R_1$—OH and about I molar equivalent of a second end-cap molecule which is an alkyl group having at least one ethylenic unsaturation, an arylalkyl group having at least one ethylenic unsaturation, or an alkylaryl group having at least one ethylenic unsaturation, as described herein, by use of a coupling agent such as DCC in the presence of a catalyst such as DMAP in the presence of a solvent such as methylene chloride at reduced temperatures.

The reaction proceeds as follows:

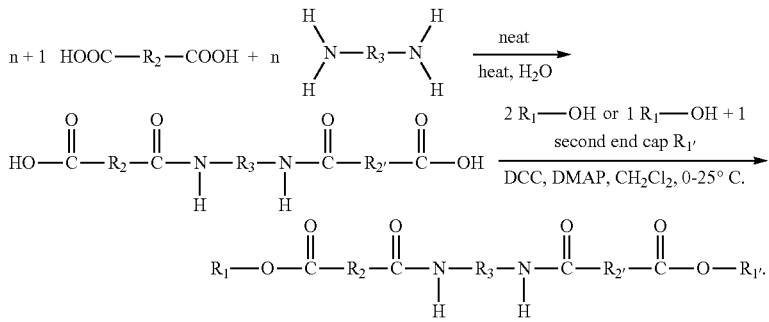

Water can be removed from the reaction mixture between the diacid and the diamine by any desired or effective method, such as by a Dean-Stark trap, molecular sieves, or other dryings agents, or the like. The reaction between the diacid and the diamine generally is run neat, that is, in the absence of a solvent. The reaction between the diacid and the diamine can be carried out at any desired effective temperature, such as from about 130° C. to about 180° C., or from about 140° C. to about 175° C., or from about 155° C. to about 165° C., although the temperature can be outside of these ranges. The reaction between the diacid and the diamine can be carried out for any desired or effective period of time, such as for about 2 to about 5 hours, or from about 2.5 to about 4.5 hours, or from about 3 to about 4 hours, although the period of time can be outside of these ranges.

Thereafter, the acid-terminated organoamide intermediate and the aromatic alcohol (or mixture of aromatic alcohol and second end-cap component) are reacted in the presence of a coupling agent and a catalyst. Suitable coupling agents include those described above, such as DCC. Suitable catalysts include those described above, such as DMAP.

The acid-terminated organoamide intermediate and the aromatic alcohol (or combined total of aromatic alcohol and second end-cap component) can be present in any desired or effective relative amounts, in embodiments at least 2 moles of aromatic alcohol per every 1 mole of organoamide intermediate, or no more than about 2.75 moles of aromatic alcohol per every 1 mole of organoamide intermediate, although the relative amounts can be outside of these ranges.

The acid-terminated organoamide intermediate and the coupling agent can be present in any desired or effect relative amounts, in embodiments at least about 1.8 moles of coupling agent per every 1 mole of organoamide intermediate, or no more than about 3 moles of coupling agent per every 1 mole of organoamide intermediate, although the relative amounts can be outside of these ranges.

The catalyst and the organoamide intermediate can be present in any desired or effect relative amounts, in embodiments at least about 0.05 moles of catalyst per every 1 mole of organoamide intermediate, or no more than about 0.8 moles of catalyst per every 1 mole of organoamide intermediate, although the relative amounts can be outside of these ranges.

Any desired or effective solvent can be employed including the solvents described above. The solvent can be present in any desired or effect relative amounts, in embodiments at least about 20 milliliters of solvent per gram of organoamide intermediate, or no more than about 100 milliliters of solvent per gram of organoamide intermediate, although the amount of solvent can be outside of these ranges.

The reaction between the organoamide intermediate, the aromatic alcohol (or aromatic alcohol and second end-cap component), and the coupling agent can be carried out at any desired or effective temperature, such as at least about 15° C. to about 50° C., or from about 20° C. to about 40° C., or from about 25° C. to about 35° C., although the temperature can be outside of these ranges.

The reaction between the acid-terminated organoamide intermediate, the aromatic alcohol (or aromatic alcohol and second end-cap component), can be carried out for any desired or effective period of time, such as from about 2 hours to about 12 hours, or from about 2 to about 5 hours, or from about 2.5 to about 4 hours, although the period of time can be outside of these ranges.

Subsequent to completion of the reaction, the product can be treated by any desired or effective method, such as filtration of any solid by-products or washing the solution with water depending on the coupling agent used. The solvent can be removed by rotary evaporation. If needed, the product can be purified by washing with acetone and dried in a vacuum oven.

Many of the compounds thus prepared can exhibit gel-like behavior when present in solutions. Examples of materials in which the present compounds can be dissolved include curable monomers such as, for example, propoxylated neopentyl glycol diacrylate, such as SR9003®, commercially available from Sartomer Co. Inc. "Gel-like behavior" refers to that the compounds undergo a relatively sharp increase in viscosity over a relatively narrow temperature range. Some compounds as disclosed herein undergo a change in viscosity of at least about $10^3$ centipoise, at least about $10^5$ centipoise, or at least about $10^6$ centipoise, over a temperature range of at least about 5° C., at least about 10° C., or at least about 30° C., although the viscosity change and the temperature range can be outside of these ranges, and compounds that do not undergo changes within these ranges are also included herein.

Gel-Forming Waxes

The radiation-curable gel ink includes at least one gel-forming wax or a mixture of two or more gel-forming waxes.

Any suitable gel-forming wax may be used. The gel-forming wax may also be referred to as an "oil uptake" wax or "oil retaining" wax. Suitable waxes include those capable of reducing and/or eliminating syneresis and improving homogeneity of the final ink composition. These waxes may do so without negatively effecting the desirable properties of the gel ink. The waxes reduce syneresis and improve homogeneity by forming a gel with at least one of the ink components, for example, with the monomer. Not to be limited by scientific theory, it is believed that the wax behaves as a binder to form a gel with the monomer. Beeswax and its derivatives are known for their gel-forming capabilities with oils, and are used in the cosmetics industry. The non-wax compounds that are commonly present in waxes, such as phytosterols, fatty acids, etc., can act as emulsifiers that allow mixing and stabilization of non-polar liquids such as oils.

Suitable waxes include synthetic and natural waxes. Exemplary synthetic waxes include Kester waxes, which may be obtained by esterifying natural fatty acids with synthetic fatty alcohols. Examples of Kester waxes include K-24 (a low molecular weight very pure monoester), K-385, K-48, K-56, K-59, K-62, K-64, K-72 (a high molecular weight dimer acid ester K-82D, synthetic hard, with a high melting point beeswax K-82H and the hydroxyl polyester wax K-82P), all available from Koster Kuenen. Exemplary natural waxes include beeswax, candelila wax, Japan wax, and carnauba wax. A number of natural waxes are listed at kosterkeunen.com.

The wax may be chemically modified. For example, the wax may be polyglycerol ester-modified or polyethylene glycol modified. The term "chemically modified wax" refers to a natural or synthetic wax that has been functionalized with hydrophilic functional groups. The chemically modified wax may be formed by reacting a natural or synthetic wax having carboxylic acid groups with a mono-, di-, or polyhydric alcohol or alkoxylated alcohol, a $C_2$-$C_4$ alkylene glycol, and the like. The chemically modified wax may be a natural wax having carboxylic acid groups reacted with an ethoxylated alcohol, such as polyethylene glycol (PEG). Exemplary waxes include natural or synthetic waxes reacted with polyethylene glycol, where the number of repeating ethylene oxide groups ranges from about 2 to 100. Such waxes include PEG-esterified beeswax, PEG-esterified candelilla wax, PEG-esterified carnauba wax, PEG-esterified lanolin, PEG-esterified spermaceti wax, PEG-esterified shellac wax, PEG-esterified bayberry wax, and PEG-esterified sugar cane wax. PEG-8 beeswax is commercially available under the trade name "APIFIL®" from Gattefossé Canada Inc. (Toronto, Canada). Polyglycerol ester-modified beeswax is commercially available as Cera Bellina PG-3 from Koster Keunen Corporation. In an embodiment using polyglycerol ester-modified beeswax, the wax forms a gel with, for example, an acrylate monomer such as SR9003.

The ink composition may include the gel-forming wax in any suitable amount, such as from about 0.1 to about 30 wt % of the ink, such as from about 0.5 to about 20 wt %, or from about 0.5 to 15 wt %.

Non-Gelling Curable Waxes

The ink composition may optionally include at least one curable wax. The wax may be a solid at room temperature (25° C.). Inclusion of the wax may promote an increase in viscosity of the ink composition as the composition cools from the application temperature.

The curable wax may be any wax component that is miscible with the other components and that will polymerize with the curable monomer to form a polymer. The term wax includes, for example, any of the various natural, modified natural, and synthetic materials commonly referred to as waxes.

Suitable examples of curable waxes include waxes that include or are functionalized with curable groups. The curable groups may include, for example, an acrylate, methacrylate, alkene, allylic ether, epoxide, oxetane, and the like. These waxes can be synthesized by the reaction of a wax, such as a polyethylene wax equipped with a carboxylic acid or hydroxyl transformable functional group. The curable waxes described herein may be cured with the above curable monomer(s).

Suitable examples of hydroxyl-terminated polyethylene waxes that may be functionalized with a curable group include mixtures of carbon chains with the structure $CH_3$—$(CH_2)_n$—$CH_2OH$, where there is a mixture of chain lengths, n, where the average chain length can be in the range of about 16 to about 50, and linear low molecular weight polyethylene, of similar average chain length. Suitable examples of such waxes include the UNILIN series of materials such as UNILIN 350, UNILIN 425, UNILIN 550, and UNILIN 700 with $M_n$ approximately equal to 375, 460, 550 and 700 g/mol, respectively. All of these waxes are commercially available from Baker-Petrolite. Guerbet alcohols, characterized as 2,2-dialkyl-1-ethanols, are also suitable compounds. Exemplary Guerbet alcohols include those containing about 16 to about 36 carbons, many of which are commercially available from Jarchem Industries Inc., Newark, N.J. PRIPOL 2033. For example, C-36 dimer dial mixtures may be used, including isomers of the formula (XII):

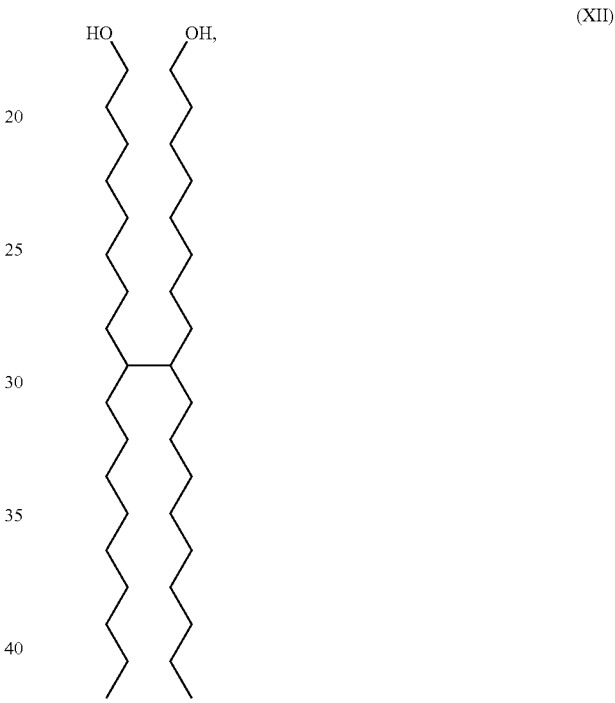

as well as other branched isomers that may include unsaturations and cyclic groups, available from Uniqema, New Castle, Del. Further information on $C_{36}$ dimer dials of this type is disclosed in, for example, "Dimer Acids," *Kirk-Othmer Encyclopedia of Chemical Technology*, Vol. 8, 4$^{th}$ Ed. (1992), pp. 223 to 237, the disclosure of which is totally incorporated herein by reference. These alcohols can be reacted with carboxylic acids equipped with UV curable moieties to form reactive esters. Examples of these acids include acrylic and methacrylic acids, available from Sigma-Aldrich Co.

Suitable examples of carboxylic acid-terminated polyethylene waxes that may be functionalized with a curable group include mixtures of carbon chains with the structure $CH_3$—$(CH_2)_n$—$COOH$, where there is a mixture of chain lengths; n, where the average chain length is about 16 to about 50; and linear low molecular weight polyethylene, of similar average chain length. Suitable examples of such waxes include UNICID 350, UNICID 425, UNICID 550 and UNICID 700 with $M_n$ equal to approximately 390, 475, 565 and 720 g/mol, respectively. Other suitable waxes have a structure $CH_3$—$(CH_2)_n$—$COOH$, such as hexadecanoic or palmitic acid with n=14, heptadecanoic or margaric or daturic acid with n=15, octadecanoic or stearic acid with n=16, eicosanoic or arachidic acid with n=18, docosanoic or behenic acid with n=20, tetracosanoic or lignoceric acid with n=22, hexacosanoic or cerotic acid with n=24, heptacosanoic or carboceric acid with n=25, octacosanoic or montanic acid with n=26, triacontanoic or melissic acid with n=28, dotriacontanoic or lacceroic acid with n=30, tritriacontanoic or ceromelissic or psyllic acid, with n=31, tetratriacontanoic or geddic acid with n=32, pentatriacontanoic or ceroplastic acid with n=33. Guerbet acids, characterized as 2,2-dialkyl ethanoic acids, are also suitable compounds. Exemplary Guerbet acids include those containing 16 to 36 carbons, many of which are commercially available from Jarchem Industries Inc., Newark, N.J., such as PRIPOL 1009. For example, C-36 dimer acid mixtures may also be used, including isomers of the formula (XIII):

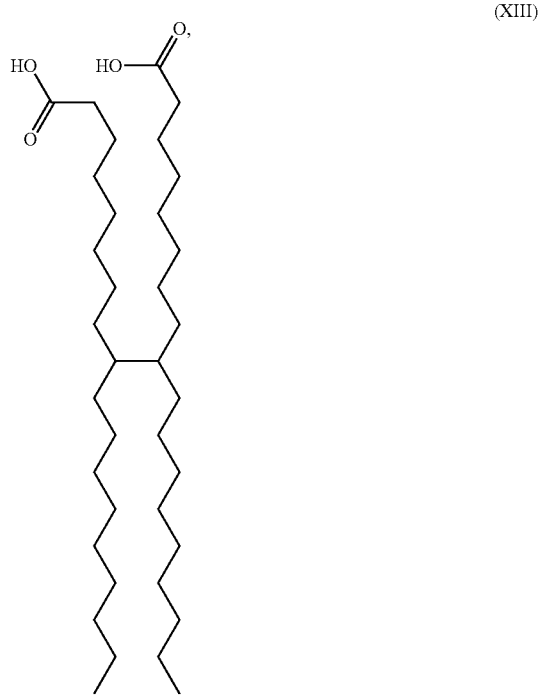

as well as other branched isomers that may include unsaturations and cyclic groups, available from Uniqema, New Castle, Del. Further information on $C_{36}$ dimer acids of this type is disclosed in, for example, "Dimer Acids," *Kirk-Othmer Encyclopedia of Chemical Technology*, Vol. 8, $4^{th}$ Ed. (1992), pp. 223 to 237. These carboxylic acids can be reacted with alcohols equipped with UV curable moieties to form reactive esters. Examples of these alcohols include, but are not limited to, 2-allyloxyethanol from Sigma-Aldrich Co. (formulas (XIV) and (XV));

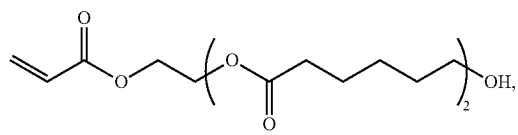

SR495B from Sartomer Company, Inc.;

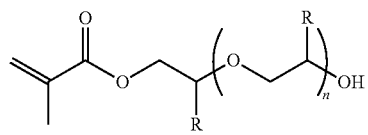

CD572 (R=H, n=10); and and SR604 (R=Me, n=4) from Sartomer Company, Inc.

The curable wax can be included in the composition in an amount of from, for example, about 0.1 to about 30 wt % of the ink, such as from about 0.5 to about 20 wt %, or from about 0.5 to 15 wt %.

Initiators

The radiation-curable gel ink includes an initiator, such as, for example, a photoinitiator, to assist in curing the ink. A photoinitiator that absorbs radiation, for example UV light radiation, to initiate curing of the curable components of the ink may be used. Ink compositions containing acrylate groups or inks comprised of polyamides may include photoinitiators such as benzophenones, benzoin ethers, benzyl ketals, α-hydroxyalkylphenones, α-alkoxyalkylphenones, α-aminoalkylphenones, and acylphosphine photoinitiators sold under the trade designations of IRGACURE and DAROCUR (available from BASF). Examples of suitable photoinitiators include 2,4,6-trimethylbenzoyldiphenylphosphine oxide (available as LUCIRIN TPO from BASF); 2,4,6-trimethylbenzoylethoxyphenylphosphine oxide (available as LUCIRIN TPO-L from BASF); bis(2,4,6-trimethylbenzoyl)-phenylphosphine oxide (available as IRGACURE 819 from BASF) and other acyl phosphines; 2-methyl-1-(4-methylthio)phenyl-2-(4-morphorlinyl)-1-propanone (available as IRGACURE 907 from BASF) and 1-(4-(2-hydroxyethoxy)phenyl)-2-hydroxy-2-methylpropan-1-one (available as IRGACURE 2959 from BASF); 2-benzyl 2-dimethylamino 1-(4-morpholinophenyl) butanone-1 (available as IRGACURE 369 from BASF); 2-hydroxy-1-(4-(4-(2-hydroxy-2-methylpropionyl)-benzyl)-phenyl)-2-methylpropan-1-one (available as IRGACURE 127 from BASF); 2-dimethylamino-2-(4-methylbenzyl)-1-(4-morpholin-4-ylphenyl)-butanone(available as IRGACURE 379 from BASF); titanocenes; isopropylthioxanthone (available as Darocur ITX from BASF); 1-hydroxy-cyclohexylphenylketone; benzophenone; 2,4,6-trimethylbenzophenone; 4-methylbenzophenone; 2,4,6-trimethylbenzoylphenylphosphinic acid ethyl ester; oligo(2-hydroxy-2-methy-1-(4-(1-methylvinyl) phenyl)propanone); 2-hydroxy-2-methyl-1-phenyl-1-propanone; benzyl-dimethylketal; and mixtures thereof. Amine synergists may also be used. Amine synergists are co-initiators that donate a hydrogen atom to a photoinitiator and thereby form a radical species that initiates polymerization (amine synergists can also consume oxygen dissolved in the ink; as oxygen inhibits free-radical polymerization its consumption increases the speed of polymerization). Exemplary amine synergists include, for example, ethyl-4-dimethylaminobenzoate and 2-ethylhexyl-4-dimethylamino-benzoate. This list is not exhaustive, and any known photoinitiator that initiates free-radical reaction upon exposure to a desired wavelength of radiation such as UV light may be used without limitation.

The photoinitiator may absorb radiation of about 200 to about 420 nm wavelengths to initiate cure, although use of initiators that absorb at longer wavelengths, such as the titanocenes that may absorb up to 560 nm, may also be used without restriction.

The total amount of initiator included in the ink composition may be from, for example, about 0.5 to about 15 wt % by weight of the ink composition, such as from about 1 to about 10 wt %.

Colorants

The radiation-curable gel ink may include an optional colorant or a mixture of two or more colorants. As used herein the term "colorant" includes pigments, dyes, mixtures of dyes, mixtures of pigments, mixtures of dyes and pigments, and the like. For simplicity, the term "colorant" as used herein is meant to encompass such colorants, dyes, pigments, and mixtures, unless specified as a particular pigment or other colorant component. The colorant may impart to the ink composition a color of, for example, black, cyan, magenta, yellow, red, green, blue, brown, orange, or purple.

Exemplary colorants include Paliogen Violet 5100 and 5890 (BASF), Normandy Magenta RD-2400 (Paul Uhlrich), Permanent Violet VT2645 (Paul Uhlrich), Heliogen Green L8730 (BASF), Argyle Green XP-111-S (Paul Uhlrich), Brilliant Green Toner GR 0991 (Paul Uhlrich), Lithol Scarlet D3700 (BASF), Toluidine Red (Aldrich), Scarlet for Thermoplast NSD Red (Aldrich), Lithol Rubine Toner (Paul Uhlrich), Lithol Scarlet 4440, NBD 3700 (BASF), Bon Red C (Dominion Color), Royal Brilliant Red RD-8192 (Paul Uhlrich), Oracet Pink RF (Ciba Geigy), Paliogen Red 3340 and 3871K (BASF), Lithol Fast Scarlet L4300 (BASF), Heliogen Blue D6840, D7080, K7090, K6910 and L7020 (BASF), Sudan Blue OS (BASF), Neopen Blue F1-4012 (BASF), PV Fast Blue B2G01 (American Hoechst), Irgalite Blue BCA (Ciba Geigy), Paliogen Blue 6470 (BASF), Sudan II, III and IV (Matheson, Coleman, Bell), Sudan Orange (Aldrich), Sudan Orange 220 (BASF), Paliogen Orange 3040 (BASF), Ortho Orange OR 2673 (Paul Uhlrich), Paliogen Yellow 152 and 1560 (BASF), Lithol Fast Yellow 0991K (BASF), Paliotol Yellow 1840 (BASF), Novaperm Yellow FGL (Hoechst), Permanerit Yellow YE 0305 (Paul Uhlrich), Lumogen Yellow D0790 (BASF), Suco-Gelb 1250 (BASF), Suco-Yellow D1355 (BASF), Suco Fast Yellow D1165, D1355 and D1351 (BASF), Hostaperm Pink E (Hoechst), Fanal Pink D4830 (BASF), Cinquasia Magenta (DuPont), Paliogen Black L9984 9BASF), Pigment Black K801 (BASF), and carbon blacks (such as REGAL 330 (Cabot), Carbon Black 5250 and 5750 (Columbian Chemicals)), and the like or mixtures thereof Additional useful colorants include pigments in water based dispersions such as those commercially available from Sun Chemical, for example SUNSPERSE BHD 6011X (Blue 15 Type), SUNSPERSE BHD 9312X (Pigment Blue 15 74160), SUNSPERSE BHD 6000X (Pigment Blue 15:3 74160), SUNSPERSE GHD 9600X and GHD 6004X (Pigment Green 7 74260), SUNSPERSE QHD 6040X (Pigment Red 122 73915), SUNSPERSE RHD 9668X (Pigment Red 185 12516), SUNSPERSE RHD 9365X and 9504X (Pigment Red 57 15850:1, SUNSPERSE YHD 6005X (Pigment Yellow 83 21108), FLEXIVERSE YFD 4249 (Pigment Yellow 17 21105), SUNSPERSE YHD 6020X and 6045X (Pigment Yellow 74 11741), SUNSPERSE YHD 600X and 9604X (Pigment Yellow 14 21095), FLEXIVERSE LED 4343 and LFD 9736 (Pigment Black 7 77226), and the like or mixtures thereof. Other useful water based colorant dispersions include those commercially available from Clariant, for example, HOSTAFINE Yellow GR, HOSTAFINE Black T and Black TS, HOSTAFINE Blue B2G, and HOSTAFINE Rubine F6B and magenta dry pigment (such as Toner Magenta 6BVP2213 and Toner Magenta EO2, which can be dispersed in water and/or surfactant prior to use).

Other useful colorants include, for example, magnetites, such as Mobay magnetites MO8029, MO8960; Columbian magnetites, MAPICO BLACKS and surface treated magnetites; Pfizer magnetites CB4799, CB5300, CB5600, MCX6369; Bayer magnetites, BAYFERROX 8600, 8610; Northern Pigments magnetites, NP-604, NP-608; Magnox magnetites TMB-100 or TMB-104; and the like or mixtures thereof. Specific additional examples of pigments include phthalocyanine HELIOGEN BLUE L6900, D6840, D7080, D7020, PYLAM OIL BLUE, PYLAM OIL YELLOW, PIGMENT BLUE 1 available from Paul Uhlrich & Company, Inc., PIGMENT VIOLET 1, PIGMENT RED 48, LEMON CHROME YELLOW DCC 1026, E.D. TOLUIDINE RED and BON RED C available from Dominion Color Corporation, Ltd., Toronto, Ontario, NOVAPERM YELLOW FGL, HOSTAPERM PINK E from Hoechst, and CINQUASIA MAGENTA available from E.I. DuPont de Nemours & Company, and the like. Examples of magentas include, for example, 2,9-dimethyl substituted quinacridone and anthraquinone dye identified in the Color Index as CI 60710, CI Dispersed Red 15, diazo dye identified in the Color Index as CI 26050, CI Solvent Red 19, and the like or mixtures thereof. Illustrative examples of cyans include copper tetra (octadecyl sulfonamide) phthalocyanine, x-copper phthalocyanine pigment listed in the Color Index as CI74160, CI Pigment Blue, and Anthrathrene Blue identified in the Color Index as DI 69810, Special Blue X-2137, and the like or mixtures thereof. Illustrative examples of yellows that may be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,4-dimethoxy acetoacetanilide, and Permanent Yellow FGL. Colored magnetites, such as mixtures of MAPICOBLACK and cyan components may also be selected as pigments.

Colorants suitable for use herein include pigment particles having an average particle size of from about 15 nm to about 500 nm, such as from about 50 nm to about 200 nm in volume average diameter.

The colorant is incorporated in an amount sufficient to impart the desired color to the ink. In general, the colorant is employed in an amount ranging from about 0.1 to about 35 wt % of the ink, such as from about 5 to about 25 wt %, or from about 10 to about 15 wt %, or from about 0.2 to about 5 wt %.

Additional Additives

The ink vehicles may be mixtures of curable components and, optionally, additional materials including curable solids, antioxidants, as well as any conventional optional additives. Such conventional additives may include, for example, defoamers, slip and leveling agents, pigment dispersants, surfactants, optical brighteners, thixotropic agents, dewetting agents, slip agents, foaming agents, antifoaming agents, flow agents, waxes, oils, plasticizers, binders, electrical conductive agents, fungicides, bactericides, organic and/or inorganic filler particles, leveling agents, opacifiers, antistatic agents, and the like. The inks may also include additional monomeric, oligomeric, or polymeric materials as desired.

Curable Solids. The radiation curable gel ink composition may optionally include curable solids. Curable solids for use in the radiation-curable compositions include radiation-curable materials that are solids at room temperature and have one or more unsaturated functional groups therein, such as one or more alkene, alkyne, acrylate or methacrylate reactive groups. The curable solids may be low molecular weight curable solids. As used herein, the term low molecular weight refers to compounds having a weight average molecular weight of about 500 Daltons or less, such as about 150 to about 450 Daltons or from about 200 to about 400 Daltons.

The curable solid may be an alkyl acrylate, aryl acrylate, alkylaryl acrylate, aryl alkyl acrylate, alkyl methacrylate, aryl methacrylate, alkylaryl methacrylate, aryl alkyl methacrylate, or mixtures thereof.

The curable solid may be present in any effective amount of the curable inkjet ink compositions, such as from about 25 to about 75 wt % of the ink, or from about 30 to about 70 wt %, or from about 40 to about 70 wt %, or from about 40 to about 65 wt %, or from about 60 to about 65 wt %.

Antioxidants. The radiation-curable gel ink compositions can also optionally contain an antioxidant. The optional antioxidants of the ink compositions protect the images from oxidation and also protect the ink components from oxidation during the heating portion of the ink preparation process. Specific examples of suitable antioxidant stabilizers include NAUGARD 524, NAUGARD 635, NAUGARD A, NAUGARD I-403, and NAUGARD 959 (all commercially available from Crompton Corporation, Middlebury, Conn.); IRGANOX 1010, and IRGASTAB UV 10 (commercially available from Ciba Specialty Chemicals); GENORAD 16 and GENORAD 40 (both commercially available from Rahn AG, Zurich, Switzerland); and the like.

When present, the optional antioxidant is present in the ink compositions in any desired or effective amount, such as at least about 0.01 wt % of the ink, at least about 0.1 wt %, or at least about 1 wt %.

Ink Preparation

The radiation-curable gel inks may be prepared by any suitable technique. For example, the inks may be prepared by mixing the optional initiator, monomer, optional gellant, and the curable wax; and heating the mixture to obtain a single phase with low viscosity. Thereafter the hot mixture is slowly added to a heated colorant (i.e. pigment) dispersion (which may be a concentrate) while agitating the mixture. The ink composition may then be filtered, optionally at an elevated temperature, through a filter to remove extraneous particles.

The method of preparation for the ink compositions may be modified so as to accommodate the type of reactive gelling agents used for the preparation of the ink compositions. For example, a concentrate of the gelling agent may be prepared in one of the components of the ink composition prior to the addition of the other components. Solutions containing co-gelling agents can also be prepared by a method similar to the one described above. Further examples of ink preparation methods are set forth in the Examples below.

The ink compositions may have gelling temperatures of from about 30° C. to about 75° C., such as from about 30° C. to about 70° C., or from about 35° C. to about 70° C., or from about 45° C. to about 70° C., or at about 65° C. In particular, the ink composition is a gel at room temperature.

When the ink composition is in the gel state, the viscosity of the ink composition is at least about 1,000 mPa·s, such as at least about 10,000 mPa·s, or at least about 100,000 mPa·s. The viscosity values in the gel state of exemplary ink compositions may be in the range of from about $10^3$ to about $10^9$ mPa·s, such as from about $10^{4.5}$ to about $10^{6.5}$ mPa·s. Gel-phase viscosity of embodiments can vary with the print process. For example, the highest viscosities may be suitable for use in exemplary embodiments that employ intermediate transfer, or when jetting directly to porous paper in order to minimize the effects of ink bleed and feathering. On the other hand, less porous substrates, such as plastic, may require lower viscosities that control dot gain and agglomeration of individual ink pixels. The gel viscosity can be controlled by ink composition and substrate temperature. An additional benefit of the gel state for radiation-curable gellant-containing ink compositions is that higher viscosities of about $10^3$-$10^4$ mPa·s can reduce oxygen diffusion, which in turn leads to a faster rate of cure in free-radical initiation.

When the ink composition is at jetting temperature, the ink composition may have a viscosity of less than about 15 mPa·s, such as less than about 12 mPa·s, or from about 3 to about 12 mPa·s, or from about 5 to about 10 mPa·s. In some embodiments, the ink compositions are jetted at temperatures of less than about 100° C., such as from about 40° C. to about 100° C., or from about 55° C. to about 90° C., less than about 80° C., such as from about 60° C. to about 80° C., such as about 70° C.

The gel ink when printed on paper may have a mass of from about 0.1 to about 1.5 mg/cm$^2$, such as about 0.4 to about 0.7 mg/cm$^2$.

The gel ink may contain any combination of elements, as long as it meets physical properties encompassed by this disclosure.

Image Forming and Inkjet Devices

Gel ink jet printing process and apparatuses are well known in the art and may include either direct or indirect image formation.

Printed images may be generated with the ink described herein by incorporating the ink into an inkjet device, such as a thermal inkjet device, an acoustic inkjet device, or a piezoelectric inkjet device, and concurrently causing droplets of molten ink to be ejected in an imagewise manner onto a substrate. The ink may be heated to a jetting temperature, for instance, above the gel-transition temperature of the ink composition.

The substrate may be at any suitable temperature during recording. The recording substrate may be at room temperature. However, in some embodiments, the substrate may be heated or cooled to have a surface temperature that is, for example, within the range of gel-phase transition temperatures for the ink composition. For example, the substrate may be maintained at a temperature of from about 5° C. to about 160° C., such as from about 15° C. to about 50° C., or from about 20° C. to about 40° C. In this way, the jetted ink may be made to rapidly form a gel.

The ink is typically included in at least one reservoir connected by any suitable feeding device to the ejecting channels and orifices of the inkjet head. In the jetting procedure, the inkjet head may be heated, by any suitable method, to the jetting temperature of the inks. The ink reservoir(s) may also include heating elements to heat the ink. The UV inks are thus transformed from the gel state to a molten state for jetting. "At least one" or "one or more," as used to describe components of the inkjet device, such as the ejecting channels, orifices, etc., refers to from 1 to about 2 million, such as from about 1000 to about 1.5 million, or about 10,000 to about 1 million of any such component found in the inkjet device. "At least one" or "one or more" as used to describe other components of the inkjet device such as the inkjet head, reservoir, feeder, etc., refers to from 1 to about 15, such as from 1 to about 8, or from 1 to about 4 of any such component found in the inkjet device.

The inks may also be employed in indirect (offset) printing ink jet applications, where droplets of the melted ink are ejected in an imagewise manner onto an intermediate transfer member and the ink in the imagewise pattern is subsequently transferred from the intermediate transfer member to a final recording substrate. An exemplary offset or indirect printing process is also disclosed in U.S. Pat. No. 5,389,958, the entire disclosure of which is incorporated herein by reference.

The intermediate-transfer member may take any suitable form, such as a drum or belt. The member surface may be at room temperature or may be heated to have a surface temperature, for example, within the gel-state temperature range for the ink composition. For example, the surface may be maintained at a temperature of about 25° C. to about 100° C., such as from about 30° C. to about 70° C., or from about 30° C. to about 50° C. In this way, the jetted ink may be made to rapidly form a gel, which gel is maintained on the surface of the transfer member until transfer to the image-receiving substrate. Thus, the ink may be heated to a jetting temperature, for instance, above the gel-transition temperature of the ink composition and then heated to a second temperature at which the gel forms that is less than the first temperature.

Once upon the intermediate-transfer member surface, the jetted ink may be exposed to a limited extent of radiation so as to effect a limited curing of the ink upon the intermediate-transfer member surface. This intermediate curing does not fully cure the ink, but merely assists in setting the jetted ink so that it may be transferred to the image receiving substrate with the appropriate amount of penetration, which requires the ink droplets to have a certain rheology before transfer. For controlling the extent of the curing if an intermediate cure is practiced, reference is made to U.S. Pat. No. 7,270,408 and co-pending U.S. Patent Application Publication No. 2006/0119686, each incorporated herein by reference. This intermediate-curing step is not necessary in embodiments in which the gel state is sufficient to impart the desired rheology to the ink droplets.

Following jetting to the intermediate-transfer member and optional intermediate curing thereon, the ink composition is then transferred to a suitable substrate.

The ink can be jetted or transferred onto any suitable substrate or recording sheet to form an image including plain papers such as XEROX 4200 papers, XEROX Image Series papers, Courtland 4024 DP paper, ruled notebook paper, bond paper, and the like; silica coated papers such as Sharp Company silica coated paper, JuJo paper, HAMMERMILL LASERPRINT paper, and the like; glossy coated papers such as XEROX Digital Color Gloss, Sappi Warren Papers LUSTROGLOSS, and the like; transparency materials; fabrics; textile products; plastics; polymeric films; inorganic substrates such as metals, ceramics, and wood; and the like.

Following transfer to the substrate or jetting to the substrate if direct printing is employed, the ink is cured by exposing the image on the substrate to radiation. For example, radiation having an appropriate wavelength, mainly the wavelength at which the ink initiator absorbs radiation, may be used. This initiates the curing reaction of the ink composition. The radiation exposure need not be long, and may occur from about 0.05 to about 10 seconds, such as from about 0.2 to about 2 seconds. The exposure times are more often expressed as substrate speeds of the ink composition passing under a UV lamp. For example, the microwave energized, doped mercury bulbs available from UV Fusion are placed in an elliptical mirror assembly that is 10 cm wide; multiple units may be placed in series. Thus, a belt speed of 0.1 ms$^{-1}$ would require 1 second for a point on an image to pass under a single unit, while a belt speed 4.0 ms$^{-1}$ would require 0.2 seconds to pass under four bulb assemblies.

The energy source used to initiate crosslinking of the radiation-curable components of the composition may be actinic, such as radiation having a wavelength in the ultraviolet or visible region of the spectrum; accelerated particles, such as electron beam radiation; thermal, such as heat or infrared radiation; or the like. Actinic radiation provides excellent control over the initiation and rate of crosslinking. Suitable sources of actinic radiation include mercury lamps, xenon lamps, carbon arc lamps, tungsten filament lamps, lasers, light emitting diodes, sunlight, electron beam emitters and the like. The curing light may be filtered or focused, if desired or necessary.

The curable components of the ink composition react to form a cured or cross-linked network of appropriate hardness and robustness. In embodiments, the curing may be substantially complete to complete, i.e., at least 75% of the curable components are cured (reacted and/or cross-linked). This allows the ink composition to be substantially hardened and much more scratch resistant, and also adequately controls the amount of show-through on the substrate.

The following examples of radiation-curable gel ink compositions further illustrate the foregoing embodiments. These Examples are illustrative of different compositions and conditions that can be used in practicing the disclosure. It will be apparent, however, that the disclosure may be practiced with many types of compositions and may have many different uses in accordance with the disclosure above.

EXAMPLES

The following ink formulations (Examples 1-4) were prepared and tested.

Example 1

Ink containing 2.5% Cera Beilina PG-3. An ink was prepared according to the formulation outlined in Table 1 (below).

TABLE 1

| Component | Wt % |
|---|---|
| Amide gellant | 7.5% |
| Cera Bellina PG-3 wax | 2.5% |
| SR9003 | 57.3% |
| SR399LV (dipentaerythritol pentaacrylate) | 5% |
| Irgacure 379 | 3% |
| Irgarcure 819 | 1% |
| Irgarcure 127 | 3.5% |
| Irgastab UV10 | 0.2% |
| 15 wt % cyan pigment dispersion/SR9003 | 20% |
| TOTAL | 100% |

Example 2

Ink containing 5% Cera Bellina PG-3. An ink was prepared according to the formulation outlined in Table 2 (below).

TABLE 2

| Component | Wt % |
|---|---|
| Amide gellant | 7.5% |
| Cera Bellina PG-3 wax | 5% |
| SR9003 | 54.8% |
| SR399LV (dipentaerythritol pentaacrylate) | 5% |
| Irgacure 379 | 3% |
| Irgarcure 819 | 1% |
| Irgarcure 127 | 3.5% |
| Irgastab UV10 | 0.2% |
| 15 wt % cyan pigment dispersion/SR9003 | 20% |
| TOTAL | 100% |

Example 3

Ink containing 10% Cera Bellina PG-3. An ink was prepared according to the formulation outlined in Table 3 (below).

TABLE 3

| Component | Wt % |
| --- | --- |
| Amide gellant | 7.5% |
| Cera Bellina PG-3 wax | 10% |
| SR9003 | 49.8% |
| SR399LV (dipentaerythritol pentaacrylate) | 5% |
| Irgacure 379 | 3% |
| Irgarcure 819 | 1% |
| Irgarcure 127 | 3.5% |
| Irgastab UV10 | 0.2% |
| 15 wt % cyan pigment dispersion/SR9003 | 20% |
| TOTAL | 100% |

Example 4

Ink containing 5% Unilin 350 acrylate, POSS-acrylate and 5% Cera Bellina PG-3. An ink was prepared according to the formulation outlined in Table 4 (below).

TABLE 4

| Component | Wt % |
| --- | --- |
| Amide gellant | 7.5% |
| Unilin 350-acrylate (PP-U350Ac-5) | 5% |
| Acrylo-POSS | 10% |
| Cera Bellina PG-3 wax | 5% |
| SR9003 | 39.8% |
| SR399LV (dipentaerythritol pentaacrylate) | 5% |
| Irgacure 379 | 3% |
| Irgarcure 819 | 1% |
| Irgarcure 127 | 3.5% |
| Irgastab UV10 | 0.2% |
| 15 wt % cyan pigment dispersion/SR9003 | 20% |
| TOTAL | 100% |

Testing and Results. The inks of Examples 1-4 were subjected to K-proof/curing. The K-proofed films were cured using a 900W Fusions UV lighthammer at 4 different belt speeds: 32, 90, 150, and 230 fpm. K-proofs are print-simulations created by rolling a plastic film over a heated metal gravure plate using a roller. Ink is transferred from the heated gravure plate onto the plastic film. The inked films are cured by passing them through a curing station consisting of a moving conveyor belt and a mercury D-bulb UV lamp. The belt speeds are reported above in feet per minute (fpm).

All the inks cured at a belt speed of 230 fpm showed full cure according to a thumb twist measurement (an evaluation of cure accepted in the UV curing industry.) Furthermore, resistance to MEK solvent rubs comparable to our current standard was also observed. "Our current standard" refers to a standard formulation baseline ink that contains wax of the non-gelling type. "MEK solvent rubs" is a semi-quantitative test used to evaluate cure. The less material that rubs off, the better the cure.

Examples 1-4 were subjected to a four-day slump test. Globules of each ink formulation were placed side by side in ambient conditions. After four days, the "slumping" of each of the globules was observed. "Slumping" increases as syneresis occurs. Examples 1-3 showed little to no slumping/syneresis. Example 4 puddled over the course of the test, exhibiting substantial slumping and syneresis. Syneresis, in this case, was estimated by looking at the approximate percentage of liquid component (monomer) that bled out. The samples that showed little to no slumping and syneresis showed approximately 0-10% of monomer leaching out. Significant syneresis would be at least approximately 20% of the monomer leaching out. Another method for quantifying syneresis can be found in U.S. Pat. No. 6,994,845 under the Examples.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A radiation-curable gel ink, comprising:
    a curable monomer,
    an organic gellant,
    a gel-forming wax which reduces and/or eliminates syneresis and improves ink homogeneity,
    an optional photoinitiator, and
    an optional colorant.

2. The ink of claim 1, wherein the gel-forming wax is present in an amount of from about 0.1 to about 30 wt % of the ink.

3. The ink of claim 2, wherein the gel-forming wax is present in an amount of from about 0.5 to about 15 wt % of the ink.

4. The ink of claim 1, wherein the gel-forming wax is a polyglycerol ester-modified wax.

5. The ink of claim 1, wherein the organic gellant comprises a compound having a formula:

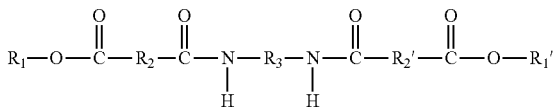

where:
    $R_1$ and $R_1'$ are the same or different, and each is independently selected from the group consisting of:
        alkyl groups having a least one ethylenic unsaturation,
        arylalkyl groups having at least one ethylenic unsaturation,
        alkylaryl group having at least one ethylenic unsaturation, and
        aromatic groups,
    provided that at least one of $R_1$ and $R_1'$ is an aromatic group, and that neither of $R_1$ or $R_1'$ is a photoinitiator group;
    $R_2$ and $R_2'$ are the same or different, and each is independently selected from the group consisting of alkylene groups, arylene groups, arylalkylene groups, and alkylarylene groups; and
    $R_3$ is an alkylene group, an arylene group, an arylalkylene group, or an alkylarylene group.

6. The ink of claim 1, wherein the organic gellant comprises a compound having a formula:

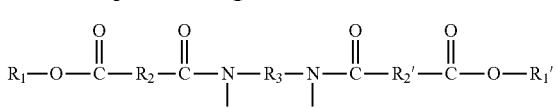

where:
    $R_1$ and $R_2'$ are the same, and are each an aromatic group;
    $R_2$ and $R_2'$ are the same or different, and each is independently selected from the group consisting of alkylene groups, arylene groups, arylalkylene groups, and alkylarylene groups; and
    $R_3$ is an alkylene group, an arylene group, an arylalkylene group, or an alkylarylene group.

7. The ink of claim 1, wherein the curable monomer is a radiation-curable monomer.

8. A method of making a radiation-curable gel ink, comprising:
mixing a curable monomer, an organic gellant, a gel-forming wax which reduces and/or eliminates syneresis and improves ink homogeneity, an optional photoinitiator, and an optional colorant to form a mixture;
heating the mixture to at least the melting point of the curable monomer; and
cooling the heated mixture to form a gel ink.

9. The method of claim 8, wherein the gel-forming wax is present in an amount of from about 0.1 to about 30 wt % of the ink.

10. The method of claim 9, wherein the gel-forming wax is present in an amount of from about 0.5 to about 15 wt % of the ink.

11. The method of claim 8, wherein the gel-forming wax is a polyglycerol ester-modified wax.

12. The method of claim 8, wherein the organic gellant comprises a compound having a formula:

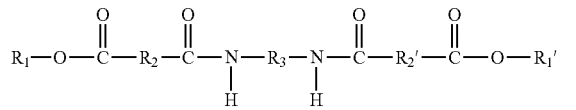

where:
R$_1$ and R$_1$' are the same or different, and each is independently selected from the group consisting of:
alkyl groups having a least one ethylenic unsaturation,
arylalkyl groups having at least one ethylenic unsaturation,
alkylaryl group having at least one ethylenic unsaturation, and
aromatic groups,
provided that at least one of R$_1$ and R$_1$' is an aromatic group, and that neither of R$_1$ or R$_1$' is a photoinitiator group;
R$_1$ and R$_2$' are the same or different, and each is independently selected from the group consisting of alkylene groups, arylene groups, arylalkylene groups, and alkylarylene groups; and
R$_3$ is an alkylene group, an arylene group, an arylalkylene group, or an alkylarylene group.

13. The method of claim 8, wherein the organic gellant comprises a compound having a formula:

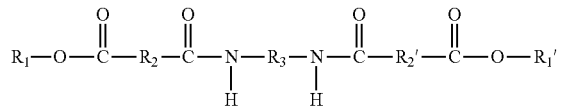

where:
R$_1$ and R$_1$' are the same, and are each an aromatic group;
R$_2$ and R$_2$' are the same or different, and each is independently selected from the group consisting of alkylene groups, arylene groups, arylalkylene groups, and alkylarylene groups; and
R$_3$ is an alkylene group, an arylene group, an arylalkylene group, or an alkylarylene group.

14. A method of forming an image, comprising:
printing with radiation-curable gel ink an image on a substrate, the radiation-curable gel ink comprising a curable monomer, an organic gellant, a gel-forming wax which reduces and/or eliminates syneresis and improves ink homogeneity, an optional photoinitiator, and an optional colorant.

15. The method of claim 14, wherein the gel-forming wax is present in an amount of from about 0.1 to about 30 wt % of the ink.

16. The method of claim 14, wherein the gel-forming wax is a polyglycerol ester-modified wax.

17. The method of claim 14, wherein the organic gellant comprises a compound having a formula:

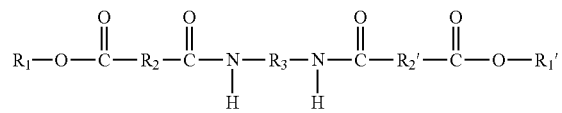

where:
R$_1$ and R$_1$' are the same or different, and each is independently selected from the group consisting of:
alkyl groups having a least one ethylenic unsaturation,
arylalkyl groups having at least one ethylenic unsaturation,
alkylaryl group having at least one ethylenic unsaturation, and
aromatic groups,
provided that at least one of R$_1$ and R$_1$' is an aromatic group, and that neither of R$_1$ or R$_1$' is a photoinitiator group;
R$_1$ and R$_2$' are the same or different, and each is independently selected from the group consisting of alkylene groups, arylene groups, arylalkylene groups, and alkylarylene groups; and
R$_3$ is an alkylene group, an arylene group, an arylalkylene group, or an alkylarylene group.

18. The method of claim 14, wherein the organic gellant comprises a compound having a formula:

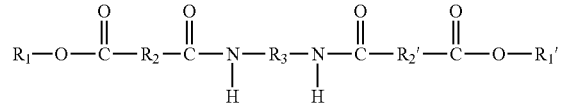

where:
R$_1$ and R$_1$' are the same, and are each an aromatic group;
R$_2$ and R$_2$' are the same or different, and each is independently selected from the group consisting of alkylene groups, arylene groups, arylalkylene groups, and alkylarylene groups; and
R$_3$ is an alkylene group, an arylene group, an arylalkylene group, or an alkylarylene group.

* * * * *